United States Patent
Maruyama et al.

(10) Patent No.: US 6,301,968 B1
(45) Date of Patent: Oct. 16, 2001

(54) VIBRATION MEASUREMENT METHOD AND APPARATUS

(75) Inventors: Tetsuro Maruyama; Akiyoshi Ohno, both of Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 09/429,325

(22) Filed: Oct. 28, 1999

(30) Foreign Application Priority Data

Oct. 30, 1998 (JP) .................................................. 10-311133

(51) Int. Cl.$^7$ ................................. C01B 9/00; G01B 9/02
(52) U.S. Cl. ........................... 73/657; 356/484; 356/519
(58) Field of Search .............................. 73/643, 657, 656, 73/655; 356/347, 349, 350, 354, 360, 484, 519, 480; 359/240

(56) References Cited

U.S. PATENT DOCUMENTS

| | | | |
|---|---|---|---|
| 4,824,240 | * | 4/1989 | Myers ................................. 356/352 |
| 4,834,111 | * | 5/1989 | Khanna et al. ........................ 73/657 |
| 4,912,530 | * | 3/1990 | Bessho ................................ 356/349 |
| 5,327,222 | * | 7/1994 | Makoto et al. ....................... 356/356 |
| 5,587,785 | * | 12/1996 | Kato et al. .......................... 356/28.5 |
| 5,808,743 | * | 9/1998 | Stephens et al. ..................... 356/373 |
| 5,814,730 | * | 9/1998 | Brodeur et al. ....................... 73/597 |
| 5,838,439 | * | 11/1998 | Zang et al. .......................... 356/349 |
| 6,100,965 | * | 8/2000 | Nerin ................................ 356/5.09 |

* cited by examiner

Primary Examiner—Hezron Williams
Assistant Examiner—Rose M. Miller
(74) Attorney, Agent, or Firm—McGinn & Gibb, PLLC

(57) ABSTRACT

The present invention provides a vibration measurement method and apparatus capable of accurately measuring displacement even if the displacement is very small. The vibration measurement method according to the present invention comprises: a laser beam application step (step S1) for applying a laser beam of a first wavelength to an object to be measured; a beat wave generation step (step S2) for mixing a laser beam of a second wavelength which is different from the first wavelength and the return beam reflected from the object to be measured; and a vibration information output step (step S3) for outputting the beat wave thus generated as a vibration information of the object to be measured.

20 Claims, 25 Drawing Sheets

VIBRATION MEASUREMENT METHOD AND APPARATUS

BACKGROUND OF THE INVENTION

1. Field of the Invention

The present invention relates to a vibration measurement method and apparatus and in particular, to a vibration measurement method and apparatus capable of detecting a very small displacement, speed, and periodicity.

This vibration measurement method and apparatus can be applied to an experiment analysis such as an automobile production technology. More specifically, engine vibration analysis, body transmission and vibration analysis, analysis of noise in the cabin, and muffler vibration analysis. The present invention can also be applied to various other fields. Since the present invention can accurately measure a very small vibration with a non-contact state, it can be applied to an instrument damage such as a drill. Furthermore, the present invention can be applied to vibration of a plant using a motor, leak of a water pipe and a gas pipe. Furthermore, sweetness of a large size fruit such as watermelon can be checked according to the vibration caused by knocking. Here, the vibrating object to be measured includes a vast area from the engine to the watermelon.

2. Description of the Related Art

Conventionally, when measuring a vibration of an object to be measured, firstly, a laser beam oscillated from a laser resonator is applied through a lens to the surface of the vibrating object. The beam is scattered on the surface and a part of the scattered beam returns to the resonator and mixed with the oscillated beam, so that the Doppler speed component becomes a beat wave. By analyzing this beat wave, vibration periodicity, speed change, and displacement are calculated.

However, in the aforementioned conventional example, when a vibrating plane has displaced by half of the laser oscillation wavelength λ, a chopping wave is generated. Accordingly, it is difficult to measure a displacement smaller than λ/2 and the speed change.

Furthermore, in the conventional example, there is a problem that when the vibrating object displaces by a very small displacement, it is impossible to calculate vibration by replacing the Doppler frequency with a vibration plane moving speed.

SUMMARY OF THE INVENTION

It is therefore an object of the present invention to provide a vibration measurement method and apparatus capable of accurately measuring a vibration of a vibrating object independently of the displacement amount of the vibrating object.

The vibration measurement method according to the present invention comprises steps of: applying a laser beam of a first wavelength to an object to be measured; generating a beat wave from a laser beam of a second wavelength different from the first wavelength and a return beam reflected by the object to be measured; and outputting the generated beat wave as a vibration information of the object to be measured.

Here, the first wavelength and the second wavelength may not be fixed to certain values. For example, the first wavelength and the second wavelength may be successively changed while maintaining a constant difference between the first wavelength and the second wavelength. Moreover, it is also possible to successively change the difference between the first wavelength and the second wavelength.

Here, the laser beam of the first length is applied to an object to be measured, and while receiving a return beam from the object, a laser beam of the second length is applied, so as to generate a beat wave of a frequency according to this wavelength difference. The return beam from the object to be measured has a wavelength changed by the Doppler effect according to the object displacement speed. Accordingly, it is possible to obtain a waveform of the Doppler frequency Fd overlapped by the beat frequency caused by the wavelength difference. Consequently, if the beat wave Fb generated in the beat wave generation step is deleted by the beat frequency component Fa generated by the wavelength difference, it is possible to obtain the Doppler frequency caused by the object displacement speed. For example, if a frequency change of the beat wave of frequency Fb or the frequency change of the frequency Fb deleted by the affect of the frequency component Fa caused by the wavelength difference is converted into a voltage change, it is possible to obtain a speed change waveform of the object to be measured.

Moreover, it is possible to store as a reference beat wave, a beat wave generated by the beat wave generation step when the object to be measured is in a normal state, so that the reference beat wave can be used for inspection of the object. That is, if a beat wave generated by the beat wave generation step is different from the reference wave, it can be decided that the object has a defect. Thus, the vibration information output step outputs as vibration information a beat wave itself, the beat wave which has been subjected to a frequency-voltage conversion into a speed change waveform, the speed change waveform which has been integrated into a displacement data, the speed change waveform which has been subjected to a frequency analysis to generate a vibration frequency spectrum of the object to be measured, and the like.

In order to generate a frequency difference between an oscillated beam and a return beam, it is possible to modulate a drive current of the laser resonator. Moreover, it is also possible to vibrate the laser source itself so as to generate a frequency difference between the oscillated laser beam and the return beam. Furthermore, it is possible to use a surface acoustic wave element to change the wavelength of the laser beam applied to an object to be measured and receive a return beam reflected from the object, so as to obtain a wavelength difference between the oscillated beam and the return beam.

DESCRIPTION OF THE PREFERRED EMBODIMENTS

Hereinafter, an embodiment of the present invention will be explained with reference to the attached drawings.

Figure 1:
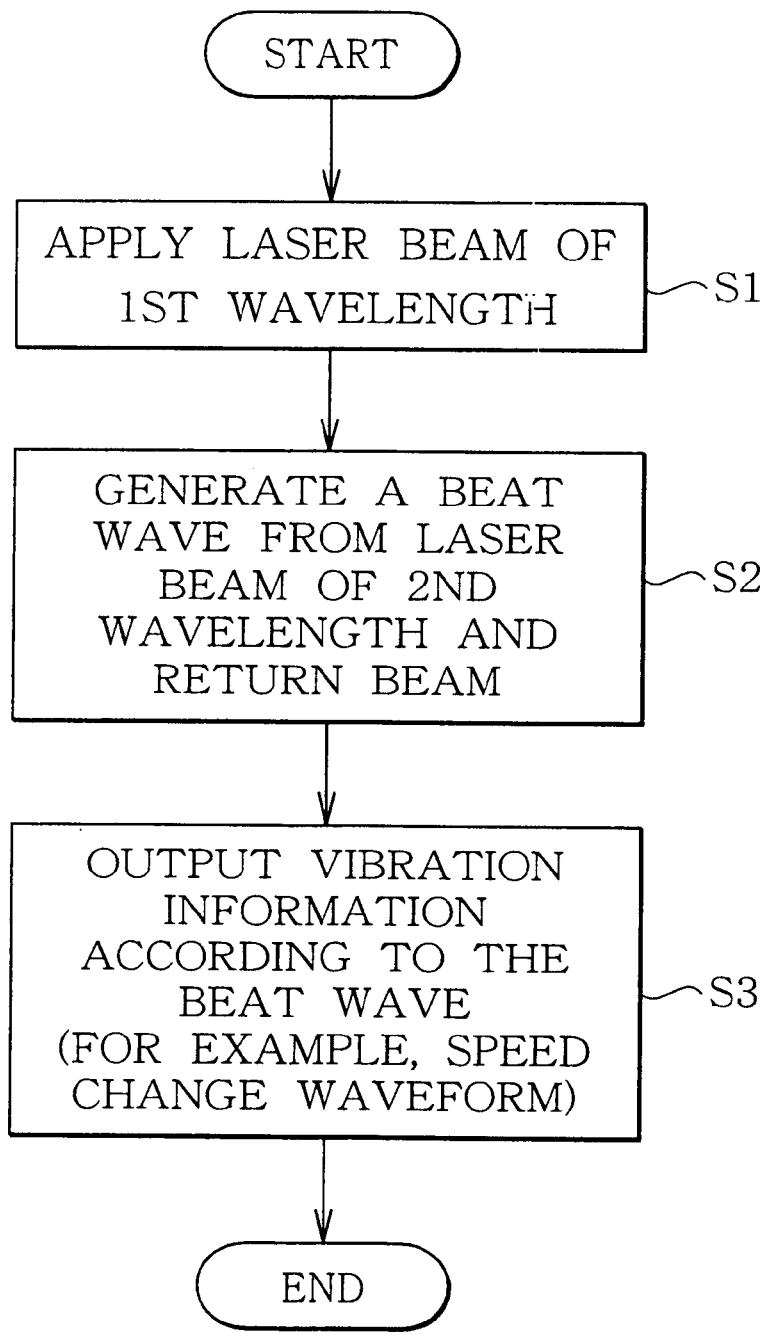
FIG. 1 is a flowchart showing a configuration of an embodiment of the present invention.

As shown in FIG. 1, the present embodiment comprises: laser beam application step (step S1) for applying a laser beam of a first wavelength to a vibrating object to be measured; a beat wave generation step (step S2) for generating a beat wave using a laser beam of second wavelength which is different from the first wavelength and a return beam reflected from the vibrating object; a vibration information output step (step S3) for outputting the beat wave generated by step S2, as a vibration information. This vibration information output step S3, for example, may include a speed change waveform generation step for generating a speed change waveform from the beat wave according to a difference between the first wavelength and the second wavelength.

Figure 2:
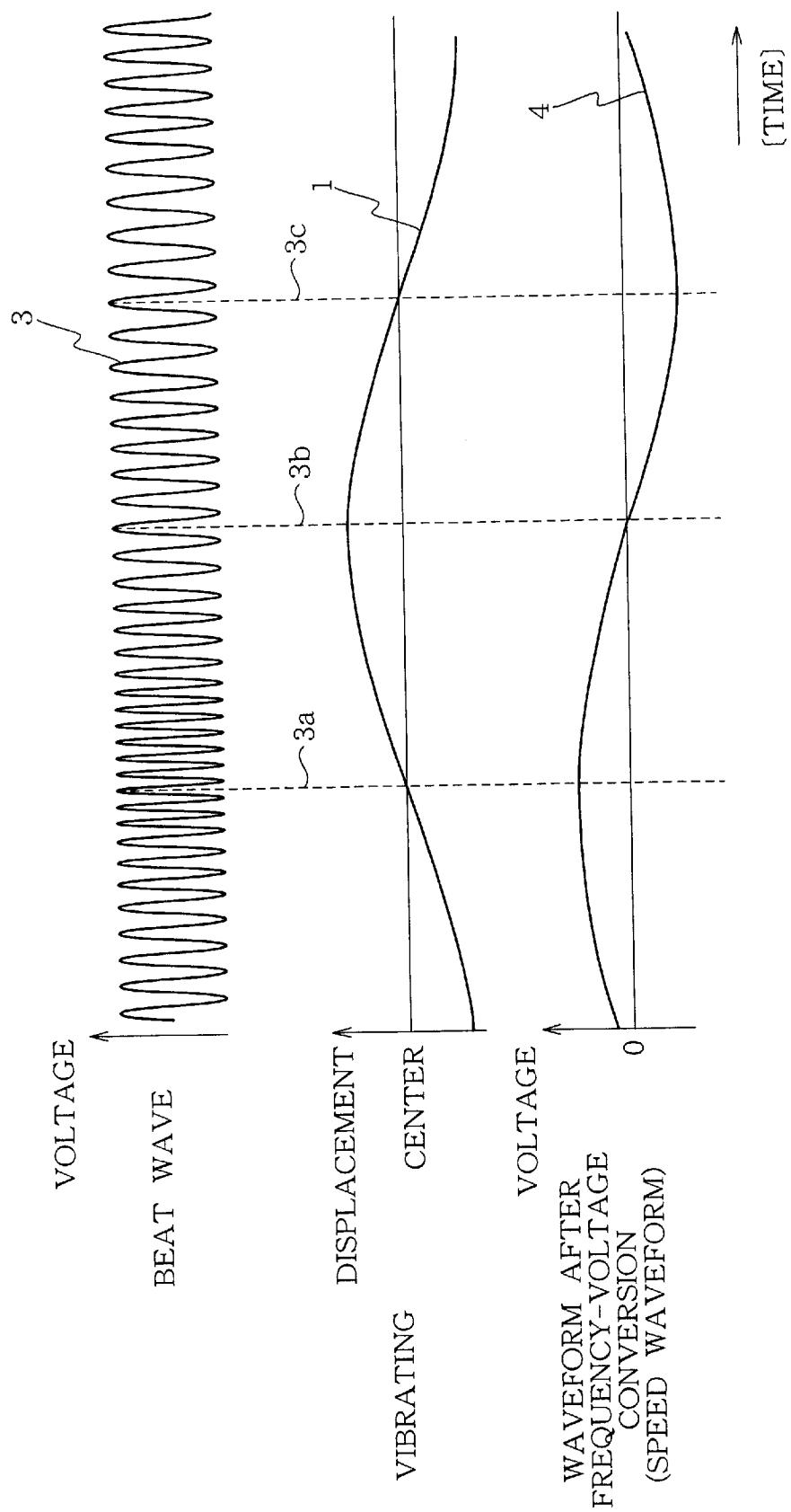
FIG. 2 shows a waveform example used in respective steps of FIG. 1.

FIG. 2 shows waveforms used in the respective steps of FIG. 1. Reference symbol 3 denotes an example of beat wave generated in the beat wave generation step S2. This beat wave consists of a frequency component Fa of a wavelength difference and a Doppler frequency component Fd caused by the Doppler effect according to the movement of the object to be measured. For example, the beat wave piece indicated by a reference symbol 3b has only frequency component of wavelength difference. The beat wave piece at the position indicated by a reference symbol 3c is a wavelength difference frequency component Fa deleted by the Doppler frequency component Fd. Moreover, the beat wave piece at the position indicated by a reference symbol 3a is a wavelength difference frequency component Fa added by the Doppler frequency component Fd. This is caused by the vibrating plane displacement direction change. In the example of this FIG. 2, there is no sign (plus and minus) reversing of a wavelength difference.

A reference symbol 1 represents motion of a vibrating plane of the object to be measured, when the beat wave 3 is obtained. Since symbol 3b does not contain the Doppler frequency, the vibrating plane stops as a turning point. At the highest position 3a and the lowest position 3c of the beat wave frequency, the vibrating plane displaces at the maximum speed. These position are vibration center positions. The vibrating plane displacement direction is determined by the sign of the Doppler frequency Fd.

When the frequency change of the beat wave 3 is converted into a voltage change, it is possible to obtain a speed change waveform shown by a reference symbol 4. If the stop position 3b of the vibrating plane is assumed to be zero, it is possible to obtain a plus speed and a minus speed according to the displacement direction of the vibrating plane. In the example of FIG. 2, the wavelength difference frequency component Fa is constant. If this wavelength difference changes continuously or intermittently, it is possible to correct the zero reference of the speed change waveform along the time axis so as to output a speed change waveform.

Moreover, in the present embodiment, since the wavelength difference high frequency component is overlapped by the Doppler frequency, it is possible to obtain the Doppler frequency independently of the laser oscillation wavelength. That is, if there is no wavelength difference frequency component Fa, it is possible to utilize that chopping beat wave is generated each time the vibrating object displaces more than the oscillation wavelength $\lambda$. In this measurement, it is difficult to measure a displacement amount of the object when the displacement is smaller than $\lambda/2$. Moreover, when the object displacement amount is smaller than $\lambda/2$, no chopping wave is generated.

In the present embodiment, however, a high frequency component is added by self-mixing of two laser beam, and the Doppler frequency component is overlapped. Accordingly, it is possible to obtain the beat wave 3 in FIG. 2 independently of the object displacement amount. Accordingly, it is possible to preferably obtain a vibration information such as a speed change waveform even if the object vibration half cycle is smaller than the $\lambda/2$. Furthermore, in the case of a chopping beat wave measurement without using the wavelength difference, when a chopping wave piece is generated, $\lambda/2$ displacement is counted. However, in the present embodiment, a displacement amount smaller than $\lambda/2$ can be measured.

Figure 3:
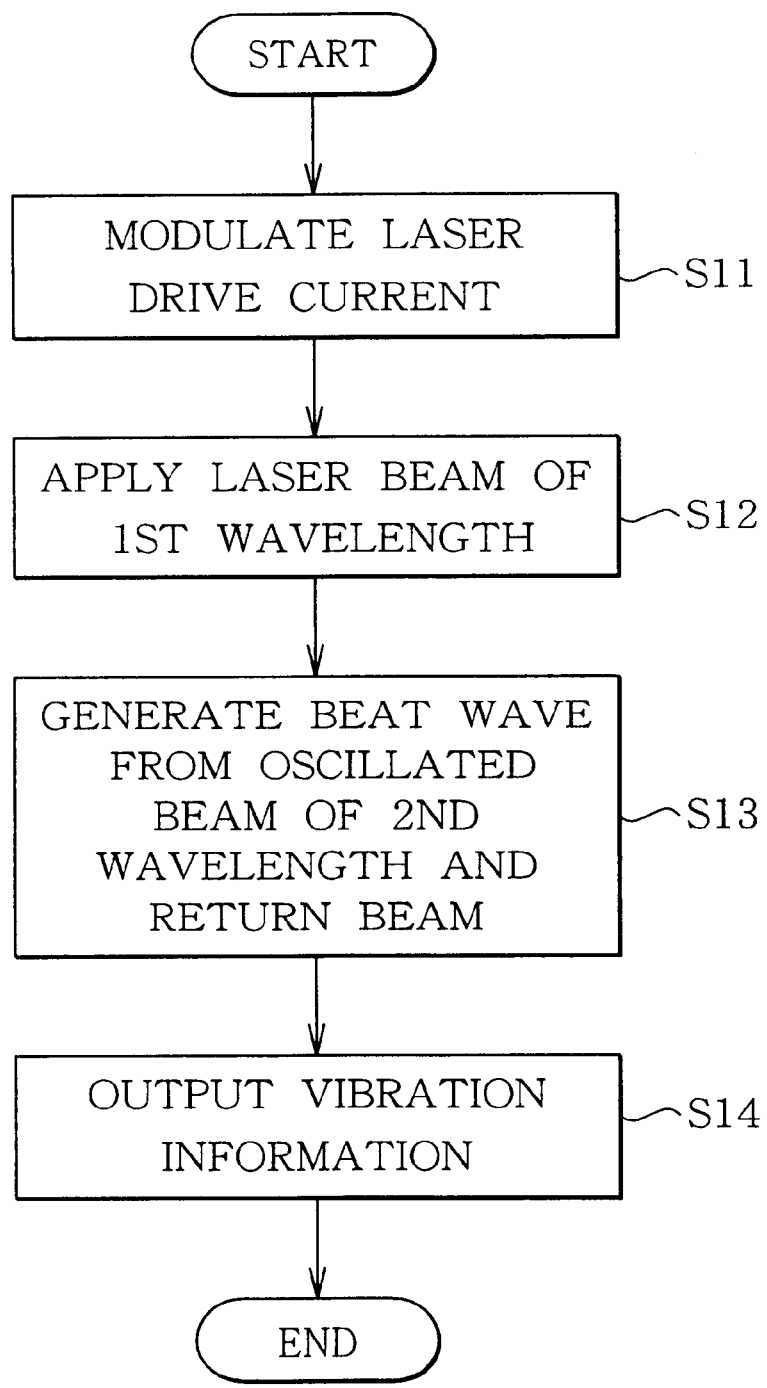
FIG. 3 is a flowchart showing a configuration of the embodiment of the present invention when a laser drive current is modulated.

FIG. 3 is a flowchart showing a wavelength difference generation by modulating the laser drive current. In the example of FIG. 3, the drive current modulated by the laser resonator is added (step S1) so that a laser source emits a laser beam whose wavelength is successively changed (step S12). The return laser beam reflected by the object to be measured is received and a beat wave is generated by this return beam and the oscillated laser beam with different wavelengths in the laser resonator (step S13). This is followed by a vibration information output step (step S14) for outputting the beat wave generated by the beat wave generation step S13, as a vibration information of the object to be measured.

Figure 4:
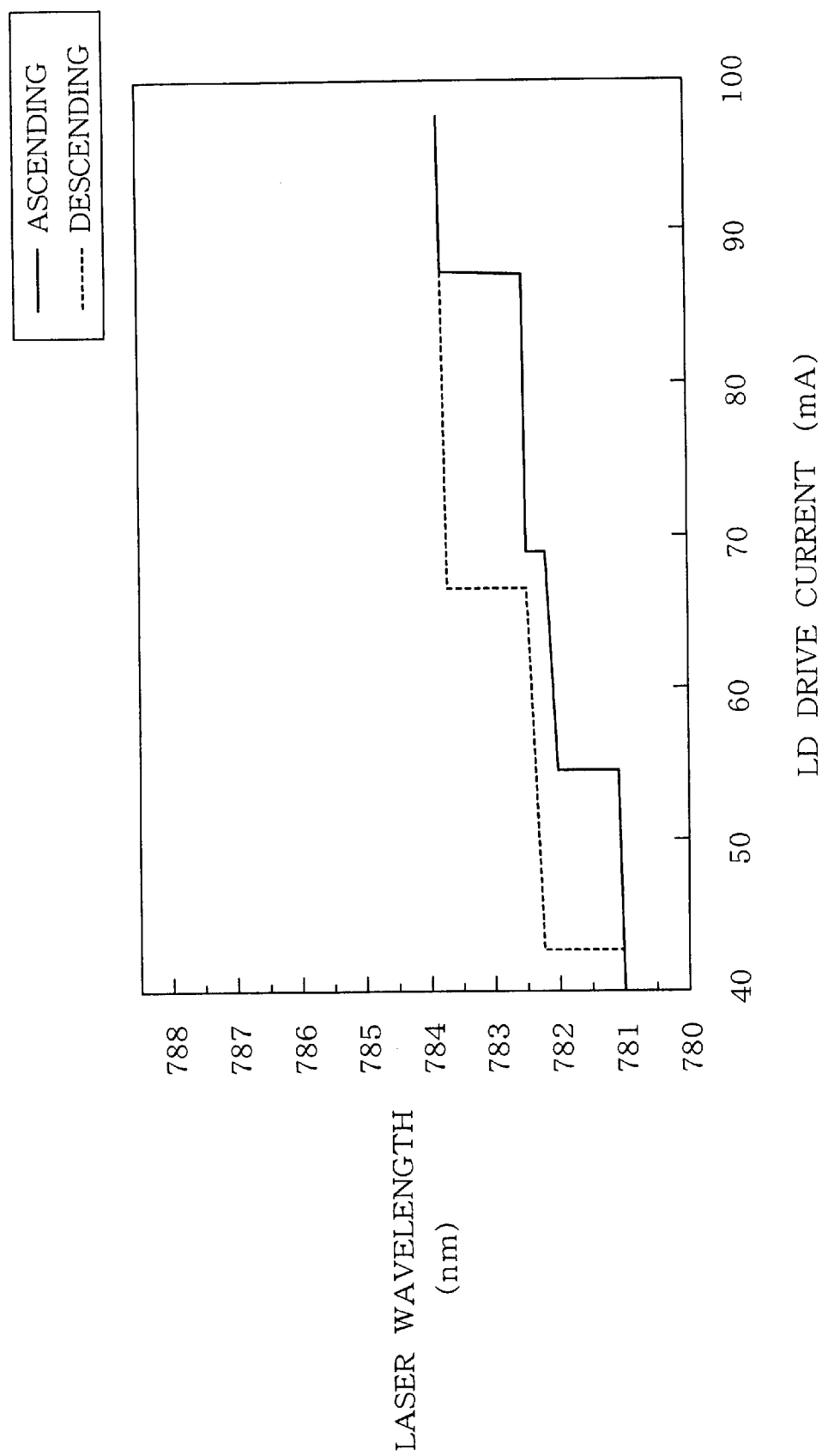
FIG. 4 is a graph showing a relationship between a laser drive current and a laser oscillation wavelength.

As is known, the laser beam wavelength can be changed by the semiconductor laser drive current. FIG. 4 shows an experiment in which a drive current is changed and the resultant wavelength change was measured. In this experiment, the phenomenon called mode hopping can be see. That is the wavelength is changed abruptly. The drive current change may be in a range causing no mode hopping (range 1) in a range causing mode hopping (range 2). The drive current change range is preferably in a single mode.

When the object to be measured is in a still state, a return laser beam has a wavelength different from an oscillated beam in the resonator, and this difference in wavelength generates a beat wave. When the object to be measured is vibrating, the vibrating plane displaces to generate the Doppler effect, which changes the wavelength. In the resonator, mixing is carried out and it is possible to obtain a beat frequency based on the drive current modulation and the Doppler frequency. As the beat frequency increases, the number of beat wave pieces appearing at one reciprocation of the vibrating plane also increases. By detecting the beat wave frequency change, it is possible to calculate a speed change of the vibrating plane displacement.

Figure 5:
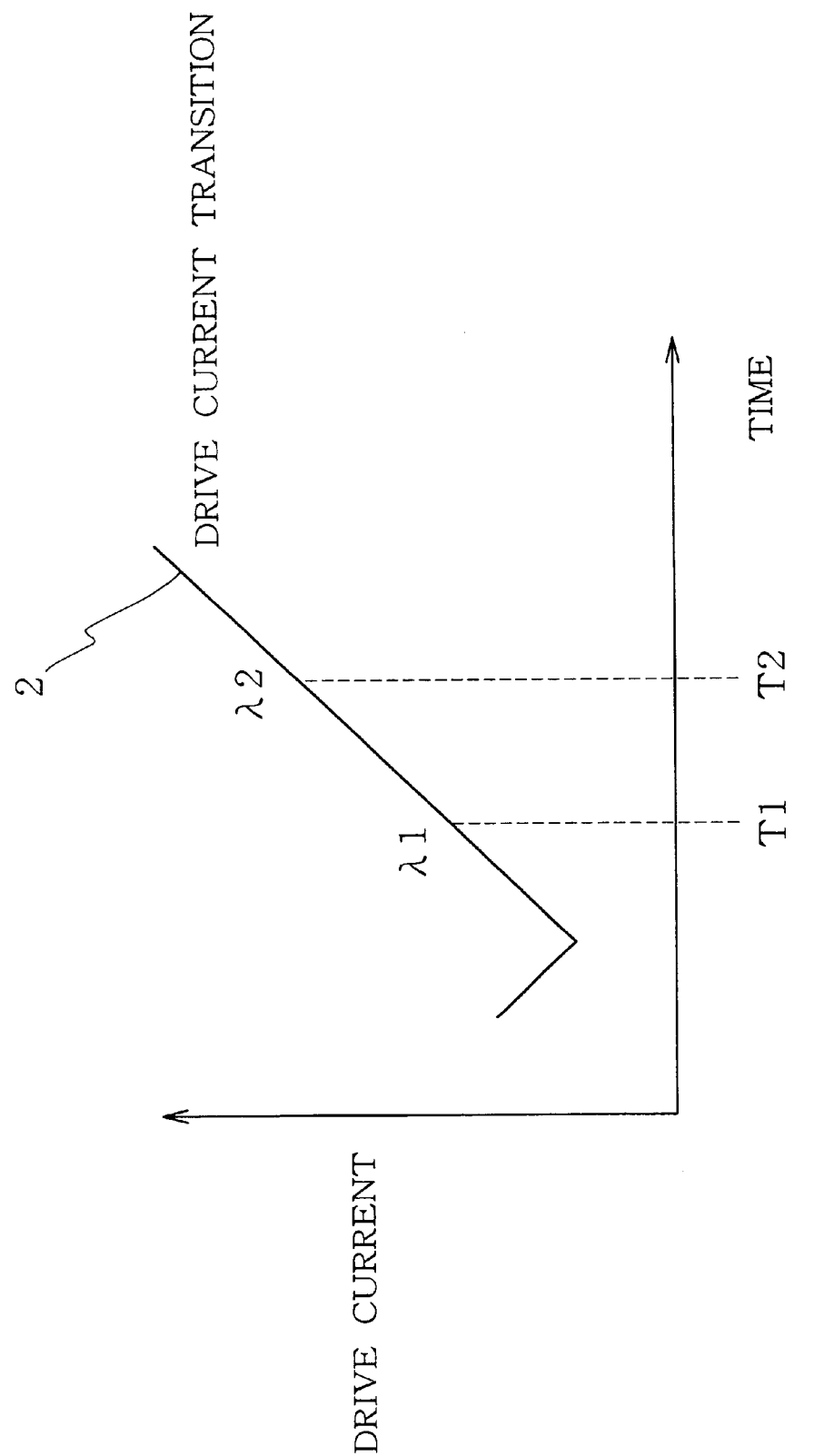
FIG. 5 is a graph showing relationship between a laser drive current transition and a laser oscillation wavelength.

Measurement method will be explained as an example. For laser drive, DC current is added by a chopping wave AC current, and a current changing within a range 1 is introduced into a laser resonator. As shown in FIG. 5, oscillated laser intensity and wavelength are changed according to the modulated drive current.

Figure 6:
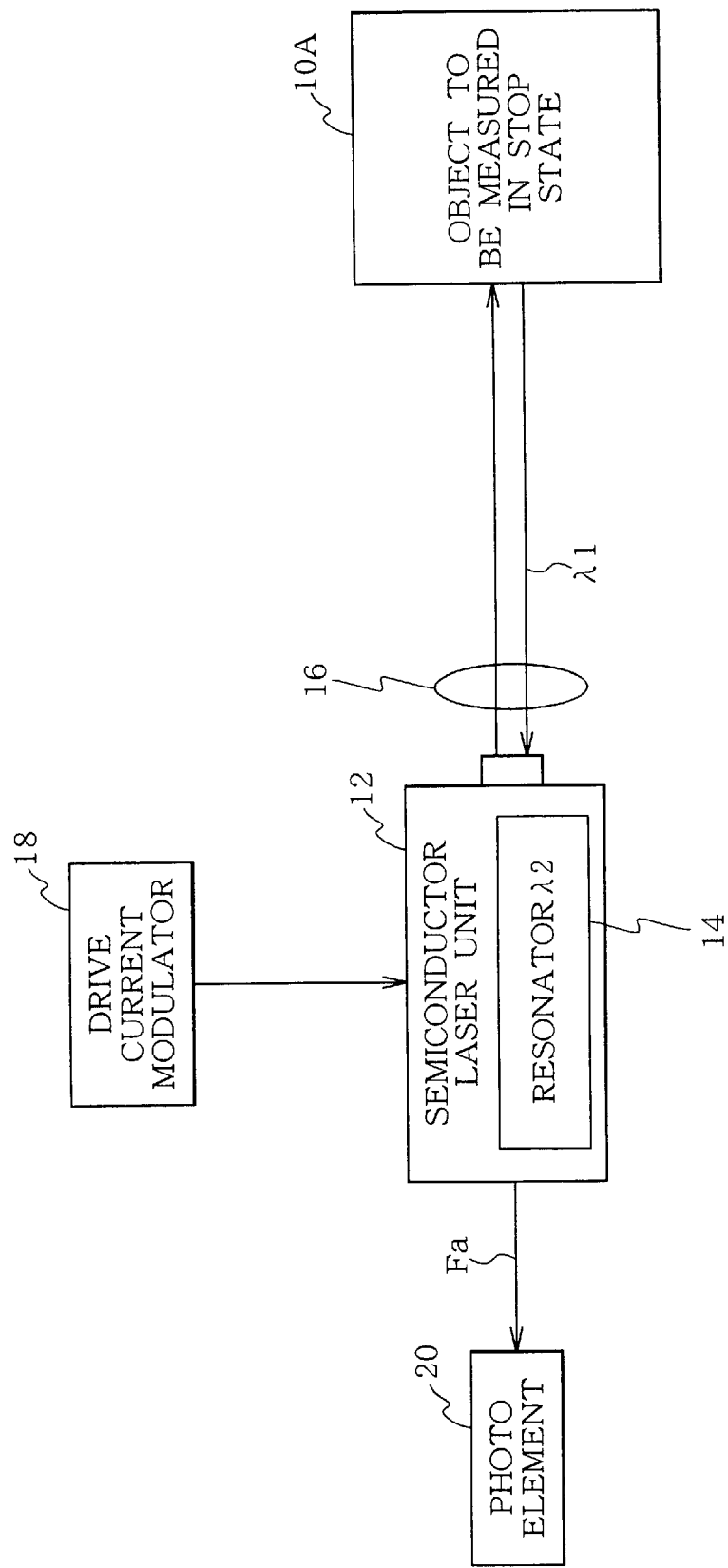
FIG. 6 is a block diagram showing a configuration of a vibration measurement apparatus according to the present embodiment.

FIG. 6 shows a laser vibration measurement apparatus as an example of an object to be measured in a still state. The laser vibration measurement apparatus of FIG. 6 includes: a drive current modulation unit 18 for generating a modulated drive current in a semiconductor laser unit 14; a laser resonator for oscillating a laser bean of wavelength according to the modulated drive current; the semiconductor laser unit 14 for applying the laser beam to an object 10A to be measured; an objective lens 16 for converging the laser beam; and a photo detection element 20 for receiving the mixture of a return beam from the object to be measured with a laser beam oscillated in the resonator.

A laser beam having a wavelength λ1 is emitted from the laser resonator at time T1 shown in FIG. 5 and scattered on the surface of the object to be measured. A part of the scattered beam returns to the laser resonator at time T2 when the oscillation wavelength by the drive current modulation in the resonator is λ2. The return beam is mixed with the oscillated beam in the resonator. The laser intensity change is extracted to obtain the beat frequency Fa as a difference between λ1 and λ2. The Fa, λ1, and λ2 are in the relationship as follows.

$$|Fa|=C|(1/\lambda 1-1/\lambda 2)| \quad \text{Equation (1)}$$

Figure 7:
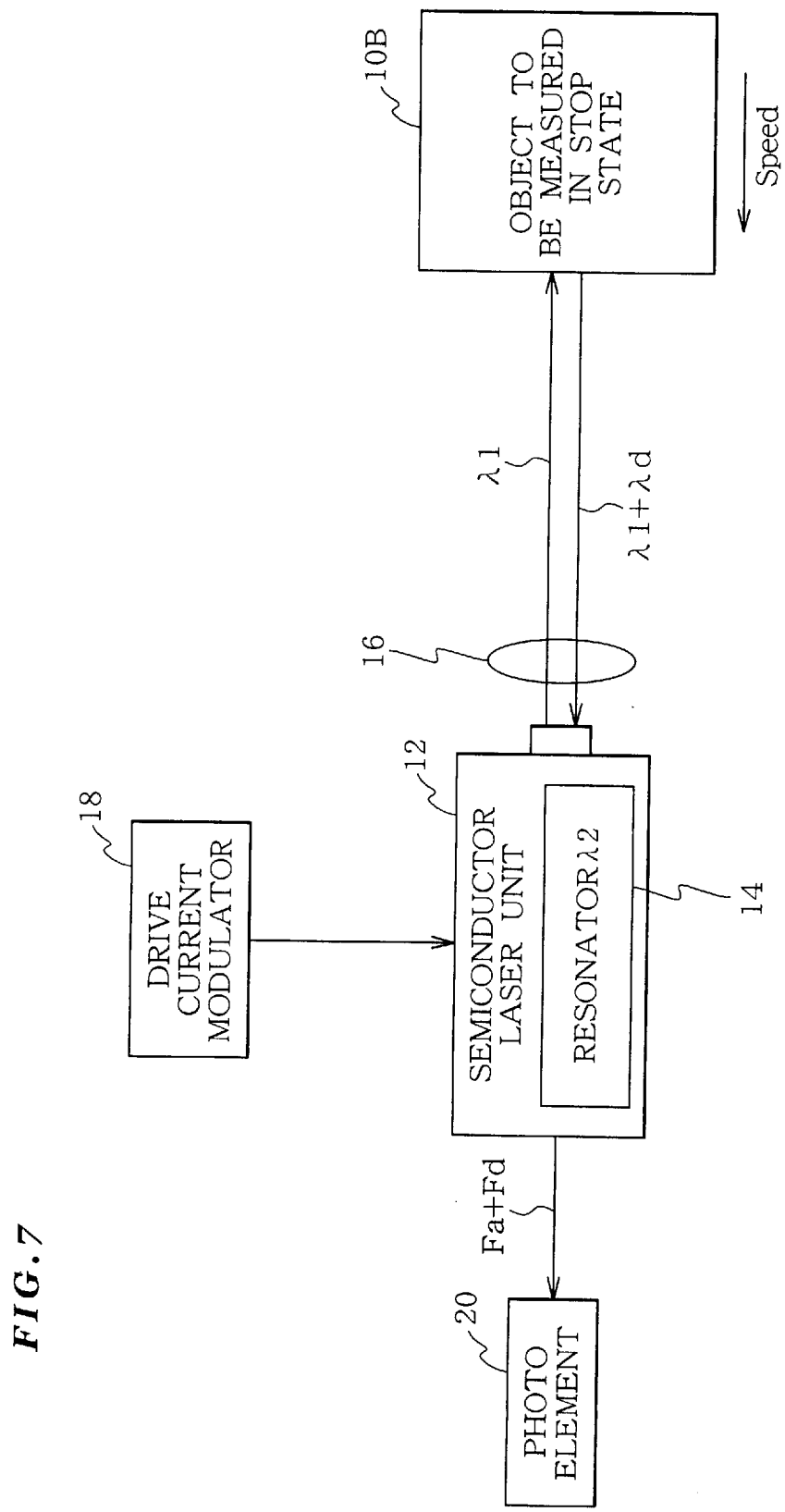
FIG. 7 is a block diagram showing an object to be measured is displacing in the configuration of FIG. 6.

FIG. 7 shows the laser vibration measurement apparatus with an object to be measured in a vibrating state. The laser beam emitted from the laser resonator at time T1 is subjected to the Doppler effect to change its wavelength when scattered on the surface of the object to be measured. When this scattered beam returns to the resonator, self-mixing occurs. That is the laser beam oscillated with wavelength λ2 is mixed with the return beam having wavelength λ1 which has been changed by the Doppler effect. Accordingly, by observing the laser beam intensity change, it is possible to measure the beat frequency of Fa added by the Doppler frequency Fd. In comparison to the beat frequency without drive current modulation, when modulation is performed, in addition to the Doppler frequency, modulation Fa is added to the beat frequency. Consequently, it is possible to obtain a high beat frequency. Even if the vibration amplitude of the object to be measured is very small, it is possible to observe a plurality of beat wave pieces while the object makes one vibration cycle. That is, it is possible to calculate vibration by simply replacing the beat frequency with a vibrating plane displacement speed.

Here, explanation will be given on the operation principle of the present embodiment. When observing a vibration of λ/2 without modulating the drive current, the beat wave appearing during the half cycle of the vibration does not have one full cycle. This is because of the following. If the vibration frequency is assumed to be Fb, one cycle is 1/Fb. This one cycle is assumed to be Ta. The vibrating plane displaces in one direction during Ta/2. The relationship between a vibrating plane speed V of the object to be measured and the Doppler frequency Fd can be expressed by Equation (2). If the object to be measured is assumed to perform sinusoidal vibration, the speed is changed moment by moment. The relationship between the speed and the displacement amount X can be expressed by Equation (3).

Here, for simplification, the vibrating plane is assumed to displace at an average speed Vav from 0 to Ta/2. By substituting Equation (4) into Equation (2), the average Doppler frequency Fadv of half vibration cycle can be expressed by Equation (5). The number of beat wave pieces Y appearing due to the Doppler effect within the half cycle can be expressed by Equation (6). Accordingly, if the displacement amount X becomes smaller than λ/2, the number of wave pieces becomes smaller than 1. That is before appearing of a whole waveform piece, the vibrating plane changes its displacement direction, disabling to catch the beat wave frequency as the Doppler frequency. Moreover, it becomes difficult to observe a speed change during the vibrating plane displacement.

By modulating the laser drive current so as to generate a beat wave beforehand, the beat frequency Fb detected after subjecting to the Doppler effect can be expressed as Fb=Fa+Fdav. Accordingly, the number of beat wave pieces appearing during a half vibration cycle can be expressed by Equation (7). If in a range defined by Equation (8), a number of beat wave pieces can be observed during the half vibration cycle. When a number of beat wave pieces are generated, it is possible to observe the beat frequency change according to the vibrating plane speed change. By converting the frequency change into voltage change, it is possible to easily calculate the vibration speed waveform.

Equations $$Fd = \frac{2|V|}{\lambda} \quad (2)$$

-continued $$\int_0^{\frac{T_a}{2}} V dt = X \quad (3)$$

$$V_{av} = X \frac{2}{T_a} \quad (4)$$

$$F_{dav} = \frac{4}{\lambda T_a} X \quad (5)$$

$$Y = F_{dav} \frac{T_a}{2} = \frac{2}{\lambda} X \quad (6)$$

$$F_b = F_a + F_{dav}$$

$$Y = (F_a + F_{dav}) \frac{T_a}{2} = F_a \frac{T_a}{2} + \frac{2}{\lambda} X \quad (7)$$

$$F_a \geq \frac{2}{T_a} \quad (8)$$

From this premise, the laser beam wavelength difference is preferably set so that the frequency (Fa) on the wavelength difference is equal to or greater than the reciprocal (2/Ta) of the half cycle (Ta/2) of the object to be measured. This enables to obtain the Doppler frequency for a very small displacement as a beat wave.

Figure 8:
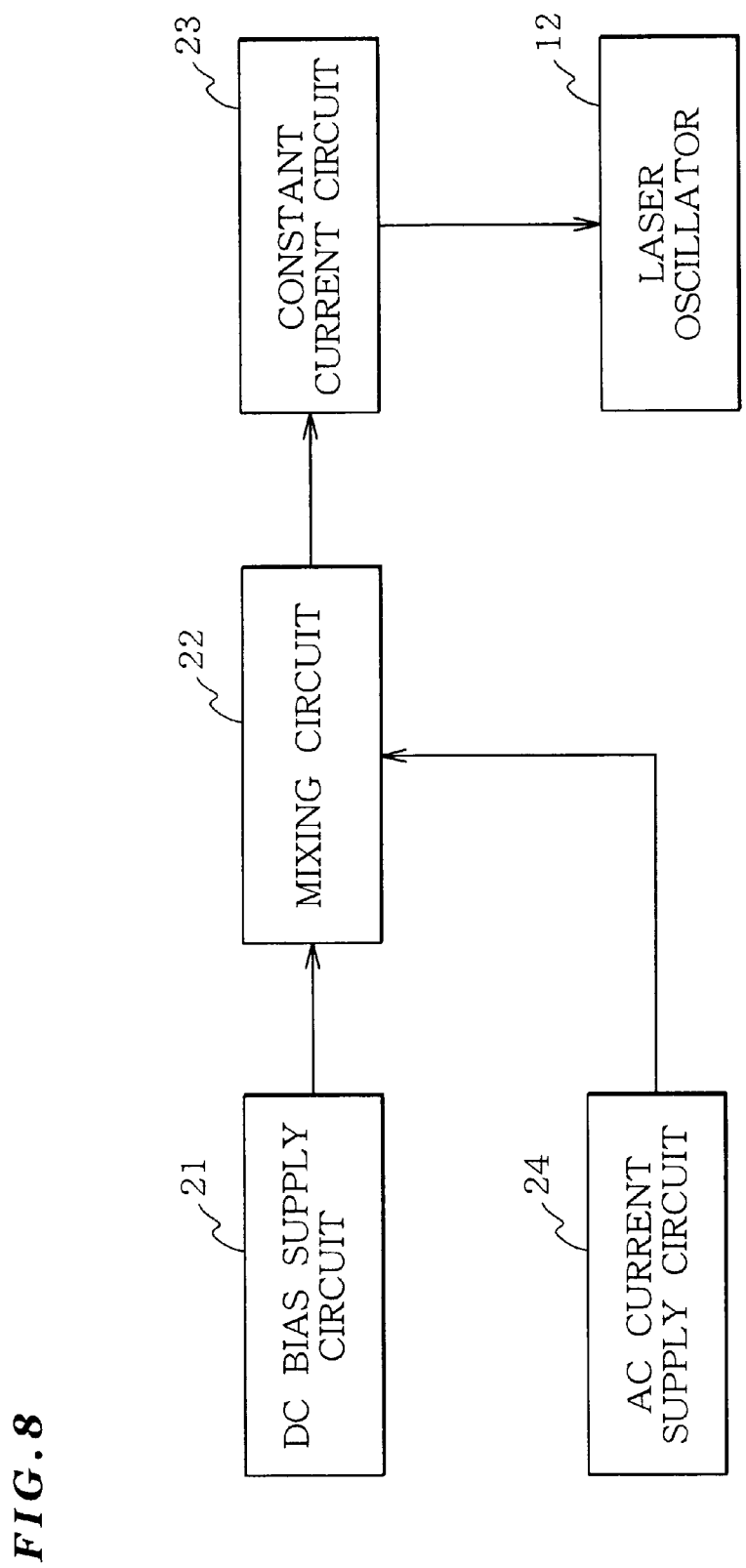
FIG. 8 is a block diagram showing a first configuration example of a drive current modulator shown in FIG. 6.

Next, detailed explanation will be given on the configuration of the laser drive current modulator 18. FIG. 8 shows that a DC component and an AC component are added for supply to the laser oscillator. The laser drive current modulator 18 includes a DC bias supply circuit 21, an AC current supply circuit 24, and a mixing circuit 22 for mixing the DC bias and AC current, and constant current circuit 23.

Figure 9:
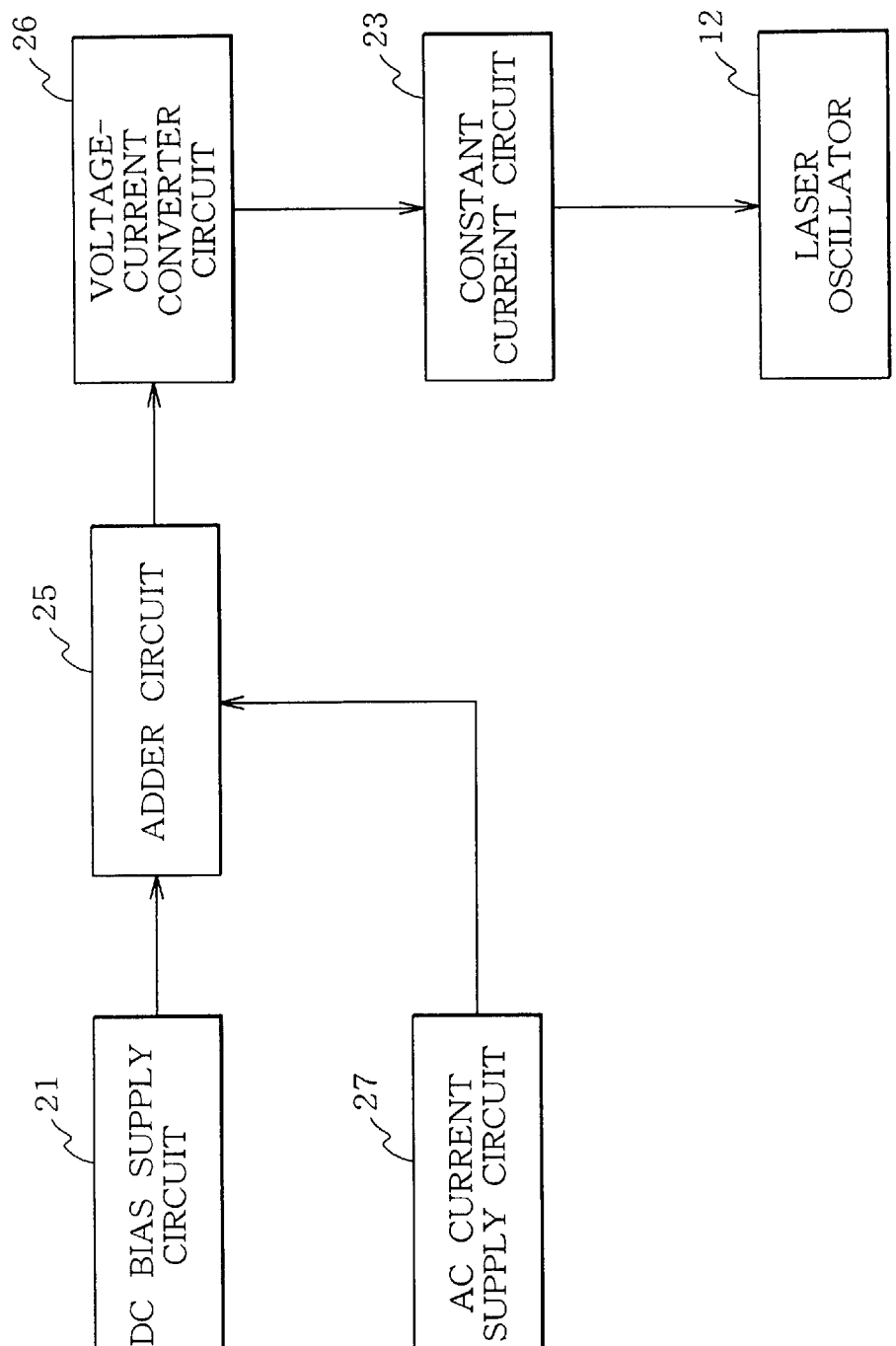
FIG. 9 is a block diagram showing a second configuration example of the drive current modulator shown in FIG. 6.

FIG. 9 shows voltage portion from two voltage sources are added and converted into current for supply to the laser oscillator 12. That is, FIG. 9 shows an example including: a DC bias voltage supply circuit 21; an AC voltage supply circuit 27; an adder circuit 25 for adding the output from the AC voltage supply circuit to the bias voltage; voltage-to-current converter circuit for converting the voltage from the adder circuit 25, into a current value; and a constant current circuit 23 for making the output from the voltage-to-current converter circuit 26, constant.

Figure 10:
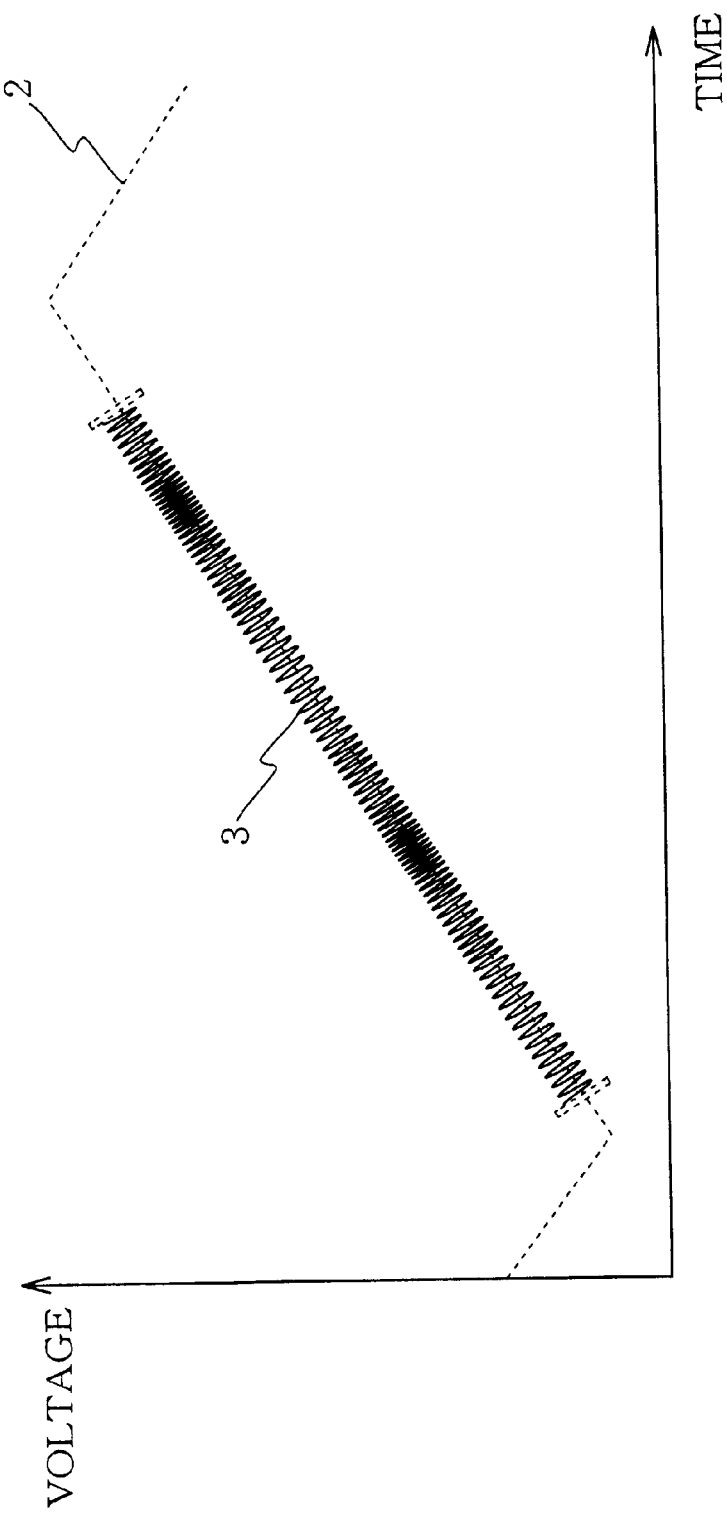
FIG. 10 shows a waveform as an example output by a photo element shown in FIG. 6.

When the AC component of the drive current is increased for the vibration cycle, as the drive current increases, the vibrating plain reciprocates several times. The beat wave in this case is shown in FIG. 10. In FIG. 10, the waveform indicated by reference symbol 2 shows increase and decrease of the center voltage of the beat wave caused by the drive current increase and decrease, and the waveform indicated by reference symbol 3 is the beat wave shown in FIG. 2.

As has been described above, according to this embodiment, a number of beat wave pieces can be obtained during a half cycle of the vibration. Accordingly, the vibrating plane displacement speed can be decided from the transition of the beat frequency. Thus, the vibration state can be accurately analyzed, including an abnormal vibration. Moreover, in the conventional method in which only one beat wave piece appears during the half cycle of the vibration, and the beat wave is converted into a digital data so that the vibration state is calculated by the program processing. This complicated processing makes it difficult to output a result at real time. On the other hand, in this embodiment, from the beat frequency obtained, it is possible to obtain a vibration speed waveform by using a frequency-voltage conversion element or the like, without requiring the aforementioned complicated processing.

EXAMPLE

Figure 11:
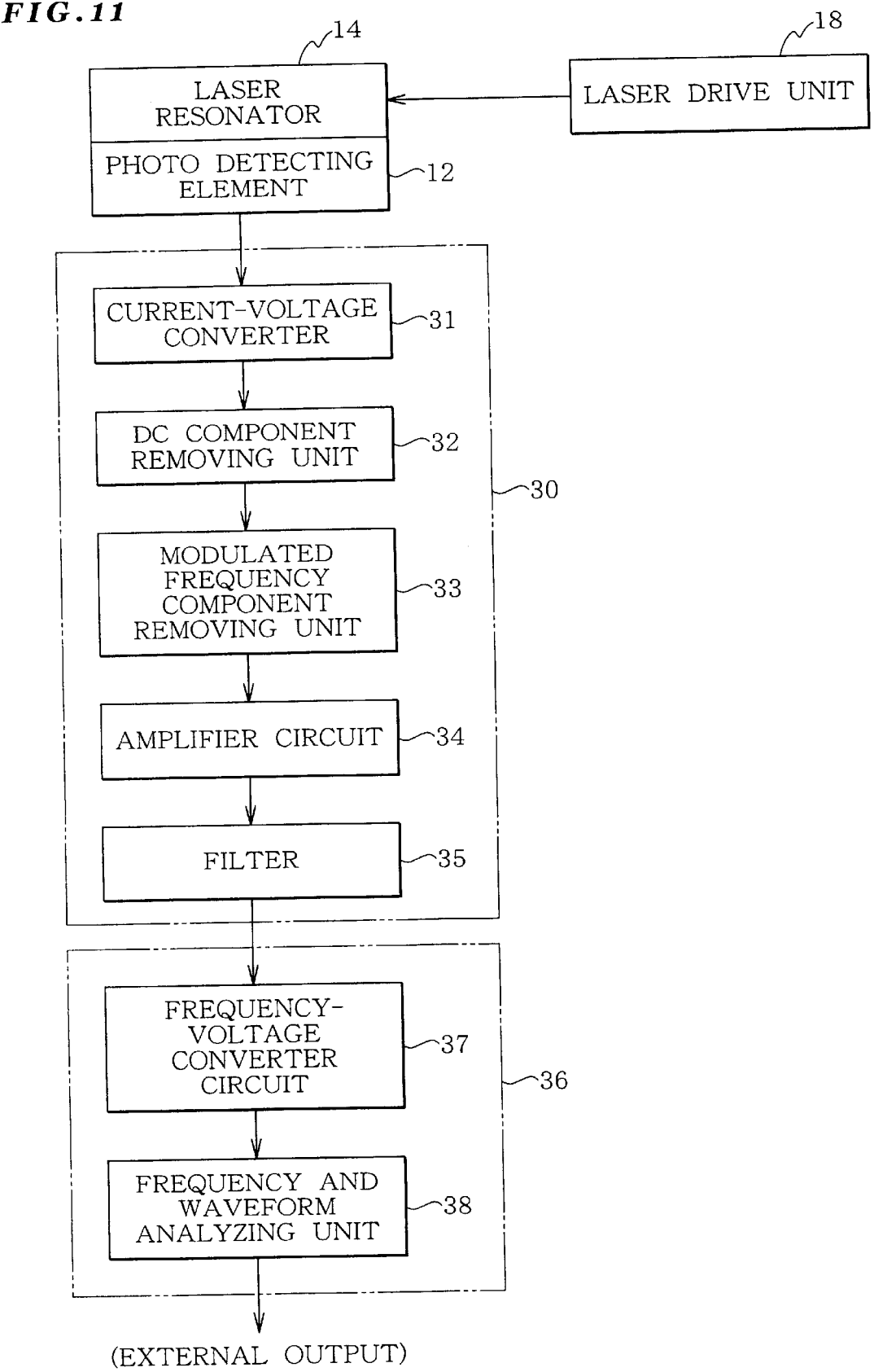
FIG. 11 is a block diagram showing a configuration example of the present invention.

Explanation will be given on an example of the embodiment. As shown in FIG. 11, the vibration measurement apparatus of this example includes; a laser resonator 14 for applying a laser beam to an object to be measured and receiving a return beam reflected by the object to be measured; a laser drive unit 18 for driving the laser resonator 14 with a modulated drive current; and a beat wave output unit 30 for outputting a beat wave generated by self-mixing in the laser resonator 14. Moreover, the laser drive unit 18 is set in such a manner that a wavelength difference between the a first wavelength when emitting a laser beam and a second wavelength when receiving a return beam, is in a relationship that the frequency (Fa) corresponding to the wavelength difference is equal to or above an inverse (2/Ta) of the half (Ta/2) of the vibration cycle (Ta) of the object to be measured.

This will be detailed below.

In this example, the vibration measurement apparatus includes a photo detection element 20 for detecting a laser beam emitted from the end surface of the laser resonator 14, as a current change; a current-to-voltage converter unit 31 for converting the current change from the photo detection element, to a voltage change; a DC component removal unit 32 for removing a DC component from the signal output from the current-to-voltage converter unit 31; a modulated frequency removal unit 32 for deleting a modulated frequency component from the signal obtained; an amplifier circuit 34 for amplifying the signal voltage; and a filter 35 for extracting a signal relating to the vibration by removing a noise. The modulated frequency component removal unit may use a filter. Moreover, it is also possible to use a differential amplifier for removing a DC component and a modulated frequency component from the signal. The components of the beat wave detection unit 30 of FIG. 11 may be realized in a different sequence.

Furthermore, in the example of FIG. 11, next to the beat wave output unit 30, there is provided a speed change waveform generator unit 36 for converting the beat wave frequency from the beat wave output unit, so as to generate a speed change waveform of the object to be measured. Moreover, the speed change waveform generation unit 36 may include a frequency-waveform analyzer 38 for analyzing the speed change waveform.

For measuring a beat wave by modulating the laser drive current, various processes are required in the beat wave output unit. These processes will be detailed below.

When an AC current is added to the laser drive current for modulation, as the drive current increases and as the drive current decreases, the wavelength relationship between the return beam and the oscillated beam in the resonator, is reversed, changing the sign of the beat frequency Fa. Accordingly, even if the speed of the object to be measured is identical, this does not mean that an identical beat frequency can be obtained. Consequently, it is necessary to select a period of time appropriate for measurement according to the cycle of the modulation drive current.

<Intermittent Measurement of a Beat Wave>

Figure 12:
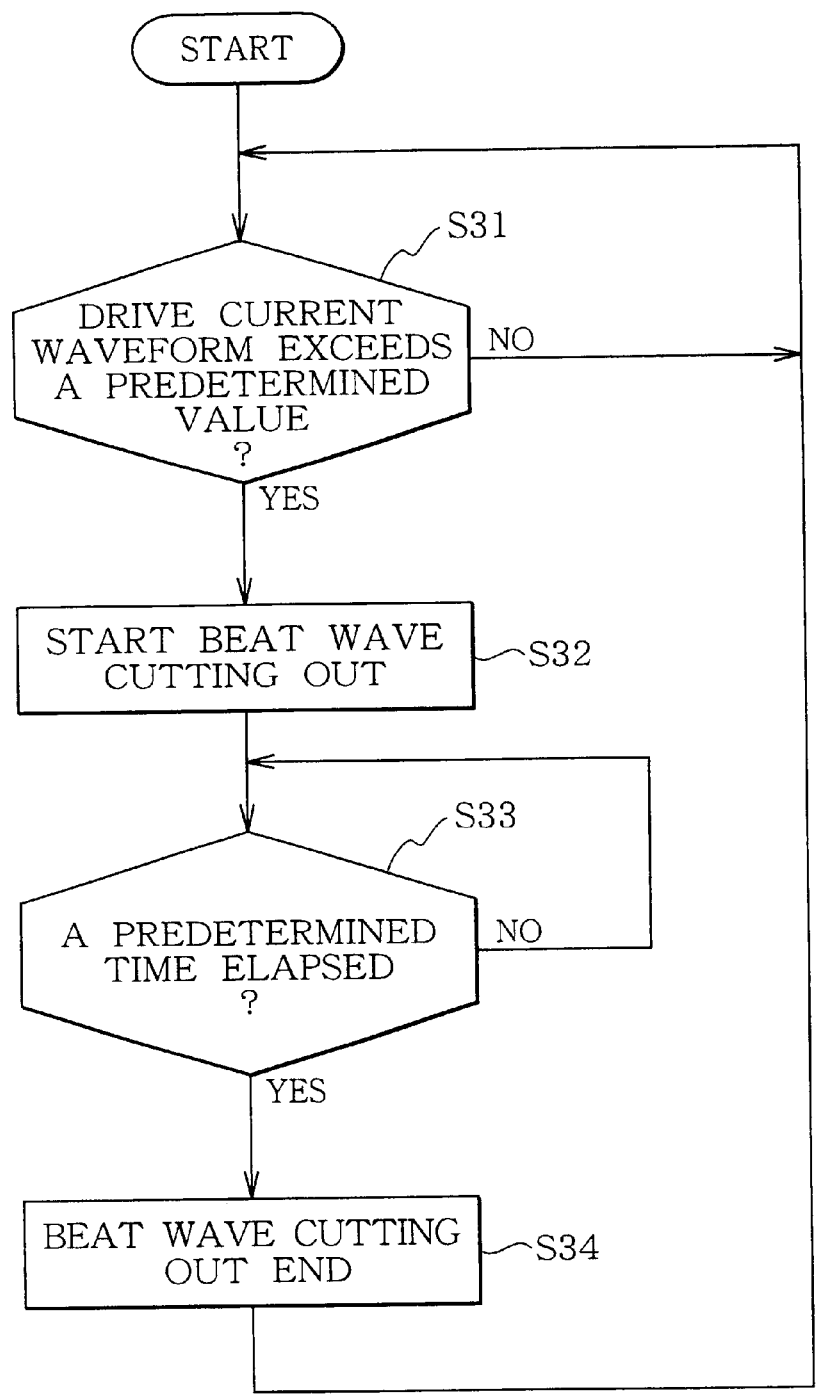
FIG. 12 is a flowchart for cutting out a part of a beat wave in the configuration of FIG. 11.
Figure 13:
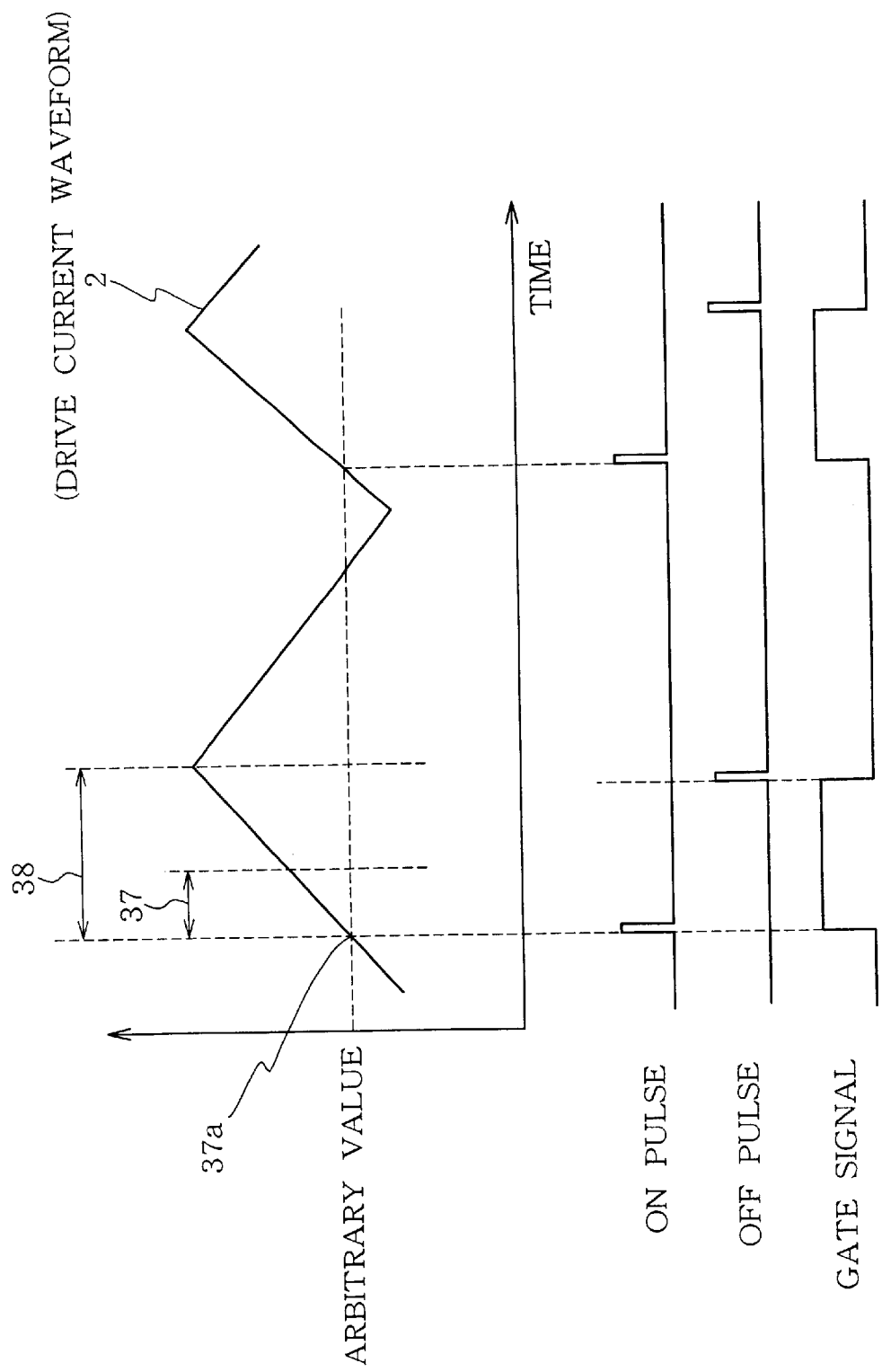
FIG. 13 is a time chart showing a cutting out process example shown in FIG. 12.

As a measurement period selection, it is possible to isolate (cut out) a part of the beat wave. FIG. 12 is a flowchart showing a beat wave of a part of the ascending drive current waveform. For example, as shown in FIG. 13, it is possible to select the entire ascending drive current 38 or a part 37 of the ascending drive current 38. For this, in the example of FIG. 12, firstly, it is checked whether the drive current waveform value has exceeded a predetermined value (step S31). Next, at the point 37 a where the drive current waveform crosses the predetermined arbitrary line (value), drive current cutting is started. For example, as shown in FIG. 13, ON pulse signal is output (step S32).

After this, for example, a timer is used to make the gate signal High and it is checked whether a predetermined period of time has elapsed (step S33). When the predetermined period of time has elapsed, the beat wave cutting out is complete (step S34). For example, as shown in FIG. 13, an OFF pulse is output.

Figure 14:
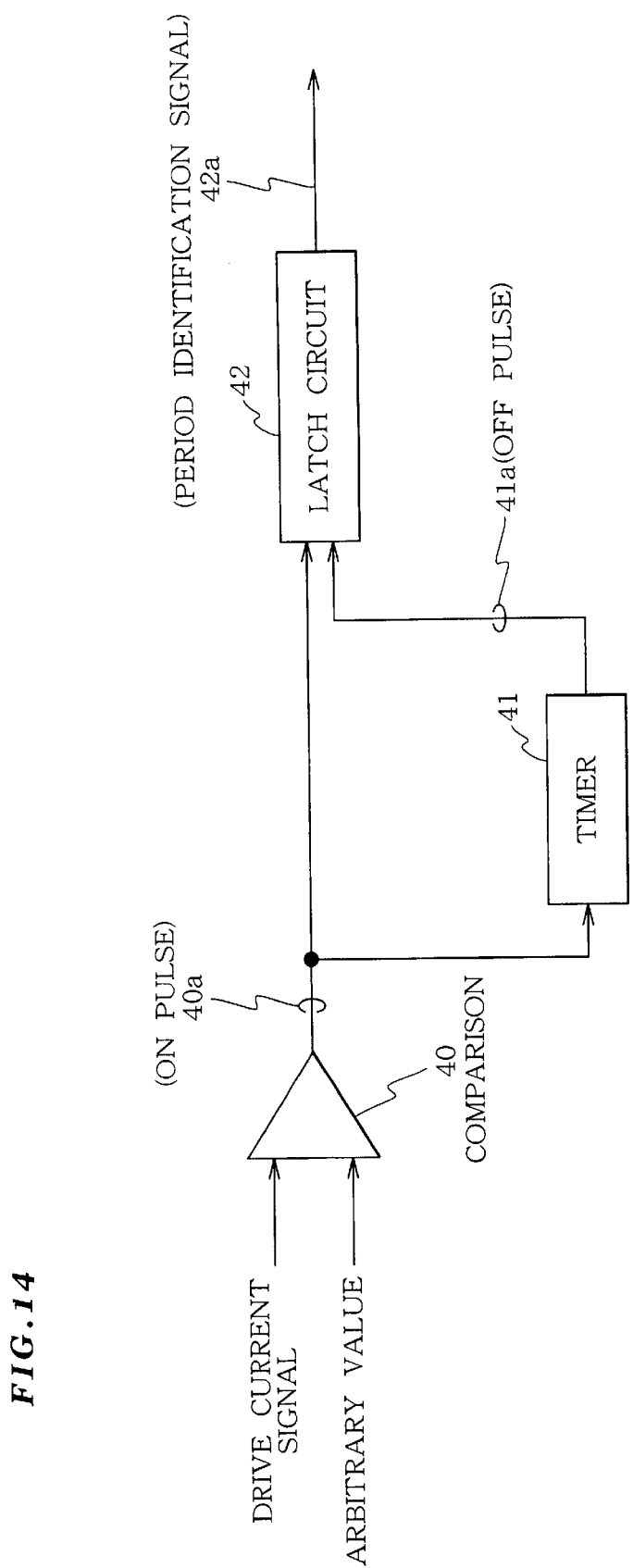
FIG. 14 is shows a circuit configuration for implementing the processing shown in FIG. 12.

The processes shown in FIG. 12 can be implemented by a circuit shown in FIG. 14 for example. The period of time while the gate signal is ON is determined by a time setting circuit (timer) 41 and realized by a latch circuit consisting of a delay element, an operation amplifier, a flip-flop circuit, a vibrator and the like. Only while the gate signal is ON, the signal from the photo element is passed, which signal is processed to obtain a vibration waveform of the same conditions. Moreover, the gate signal can be made OFF at another arbitrary value so that when this arbitrary line is crossed by the drive current, a pulse is output.

Figure 15:
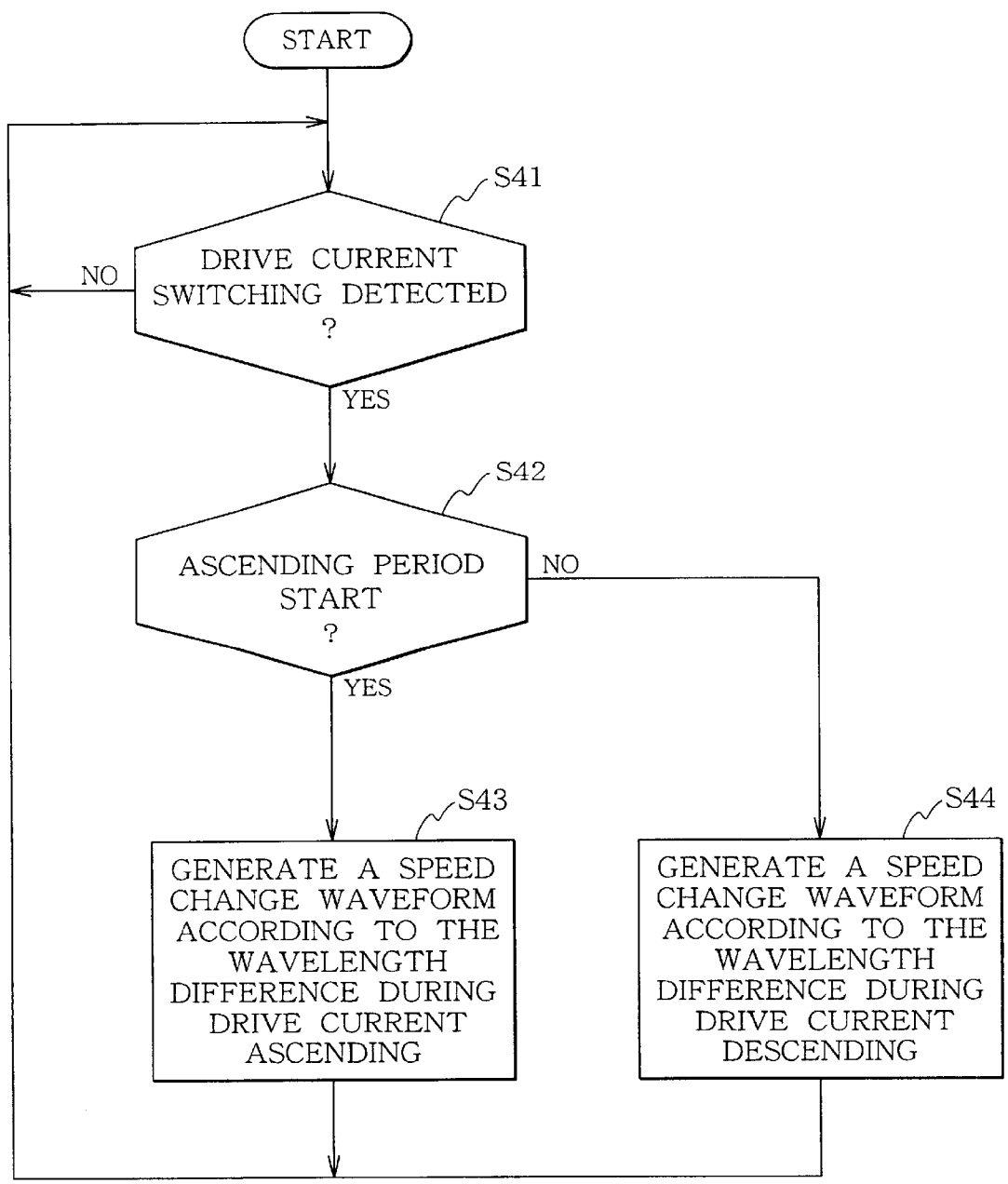
FIG. 15 is a flowchart for processing a beat wave dividing a laser drive current increase period of decrease period in the configuration of FIG. 11.

Instead of using a part of the beat wave, it is also possible to use one full beat wave piece. For example, it is possible to perform different processes for the ascending period and the descending period of the laser drive signal. For example, as shown in FIG. 15, the vibration information output step S14 of FIG. 3 includes: a drive current switching time detection step (step S41) for detecting the switching moment between the ascending period and the descending period of the drive current; a beat wave dividing step (step S42) to divide a beat wave into an ascending portion and a descending portion according to the switching moment detected in the drive current switching moment detection step S41; and after-division conversion step (steps S43 and S44) for converting the beat wave into a speed change waveform according to the beat wave which has been divided by the beat wave dividing step S42 and a wavelength difference of the beat wave portions between the drive current ascending and descending portions.

Figure 16:
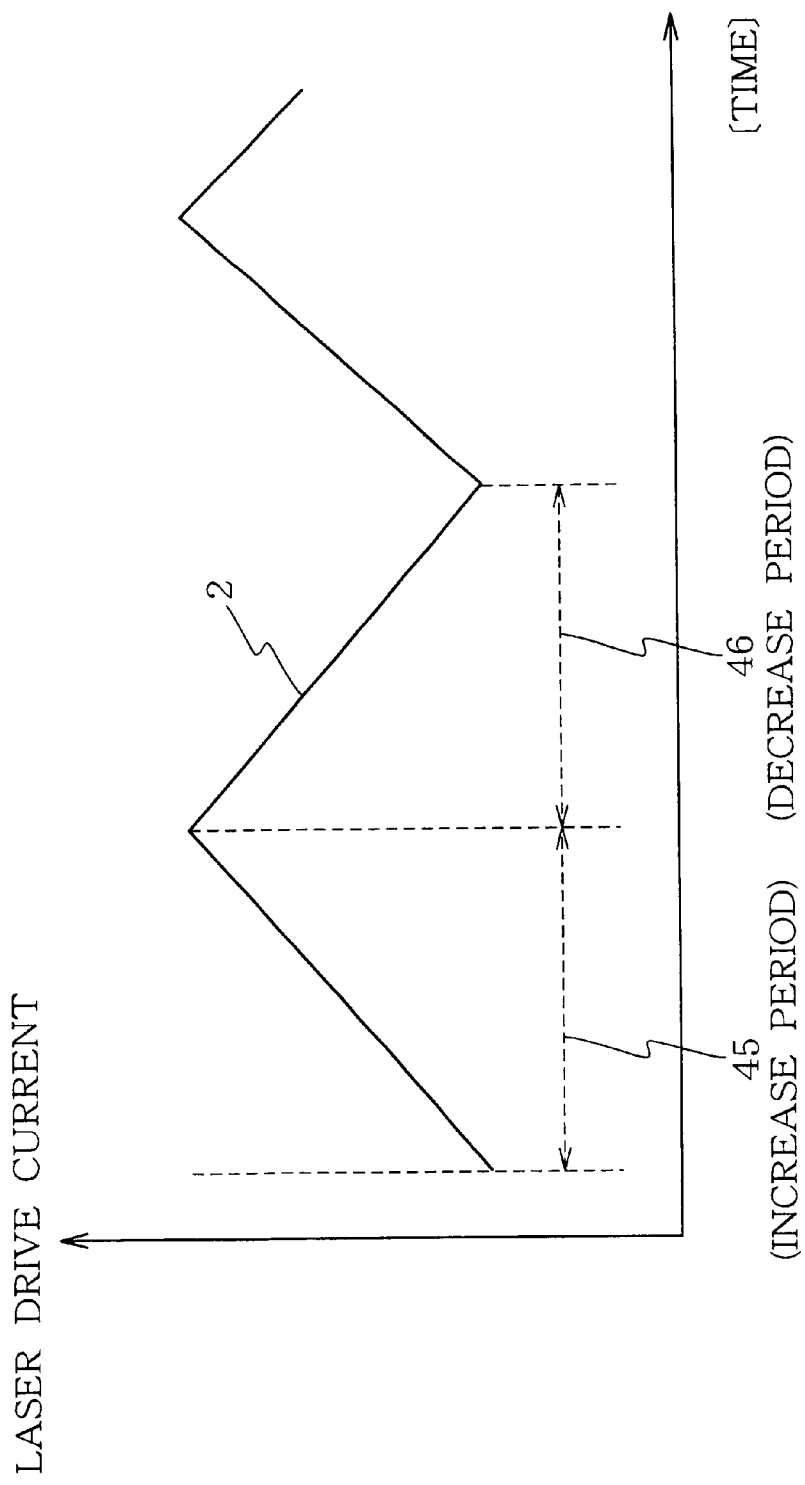
FIG. 16 shows a waveform as an example of the increase period and decrease period in the processing of FIG. 15.

In this example, the laser drive current is assumed to be a chopping wave, and as shown in FIG. 16, a beat wave is divided into the ascending period 45 and the descending period 46. For example, as shown in FIG. 4, the relationship between the laser drive current change and the laser wavelength differs when the laser drive current is increasing and when decreasing. Accordingly, in steps S43 and S44 of FIG. 15, the speed change waveform is generated according to a wavelength difference during the drive current increase and during the drive current decrease.

The increasing (ascending) period and decreasing (descending) period of the drive current can be identified as follows.

Figure 17:
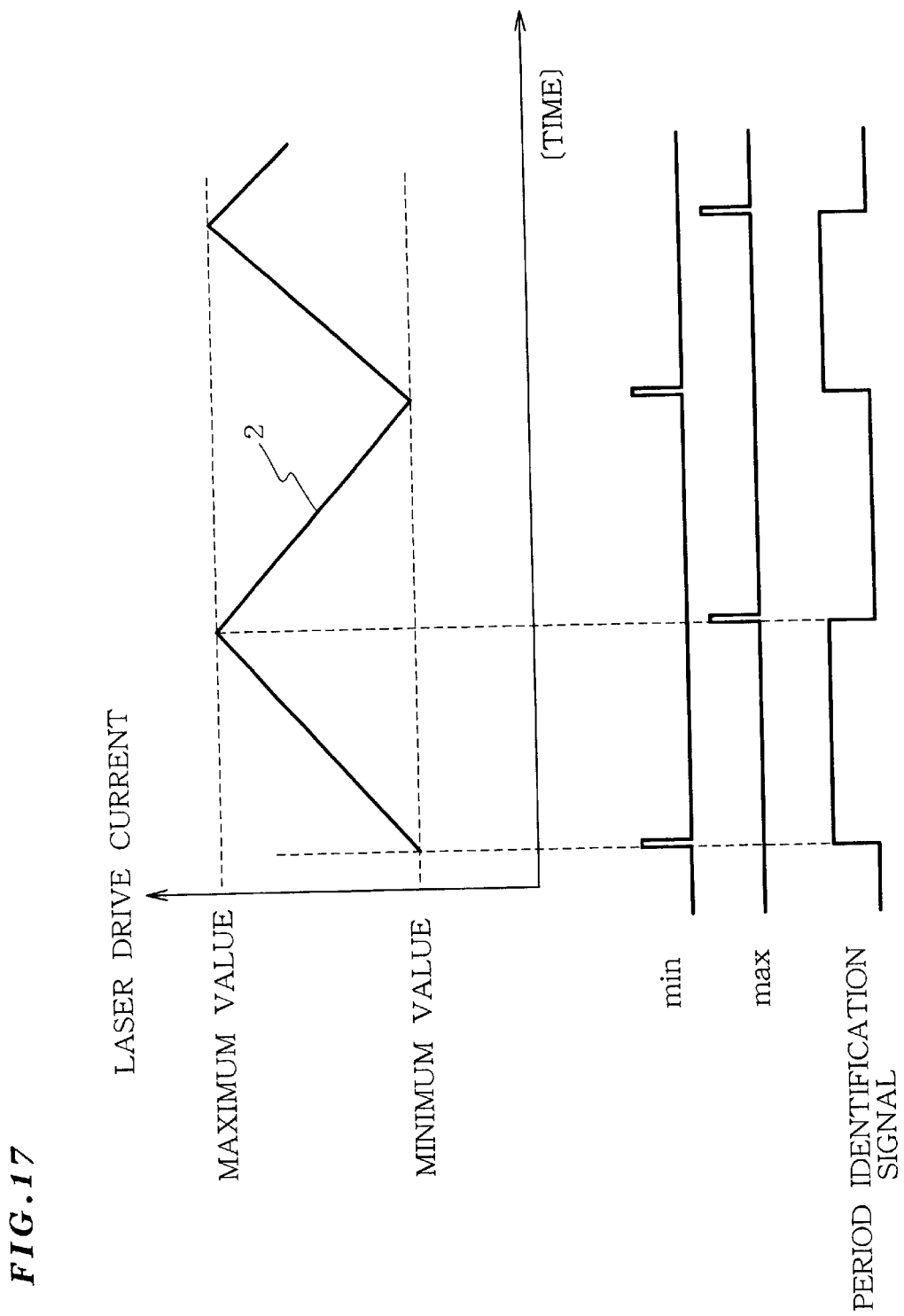
FIG. 17 is a time chart for generating a period identification signal for identifying the increase period and the decrease period in the processing shown in FIG. 15.

In the example of FIG. 17, the drive current is converted into voltage, which is compared to an arbitrary (predetermined) voltage. That is, the drive current amount is converted into voltage and the maximum value and minimum value of the AC component are identified, so that a period identification signal can be generated. For example, the AC component of the drive current can be known beforehand. The drive current amount is converted into voltage and AC voltage component is extracted, so that its maximum value and minimum value can be obtained by using a peak hold circuit or the like.

Figure 18:
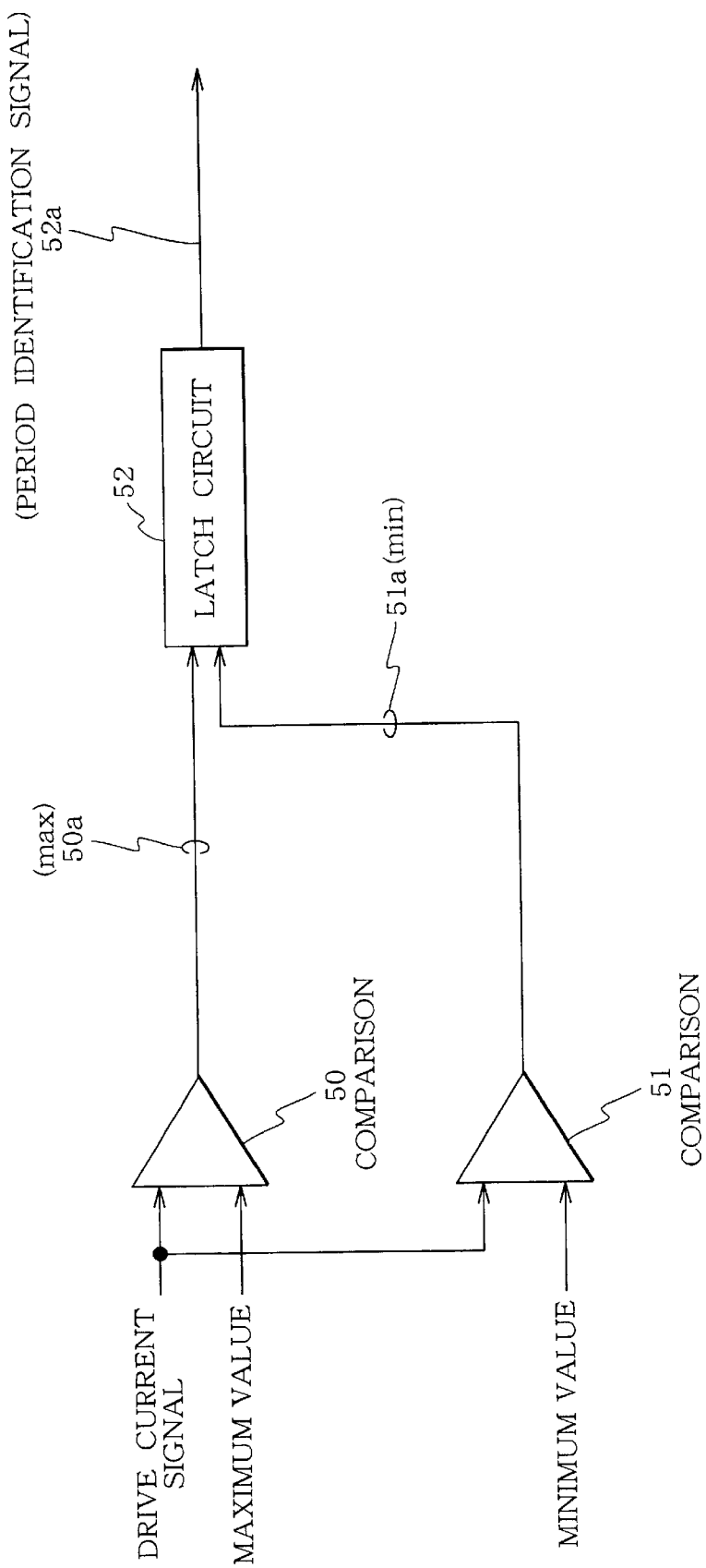
FIG. 18 shows a circuit configuration for implementing the processing shown in FIG. 17.
Figure 19:
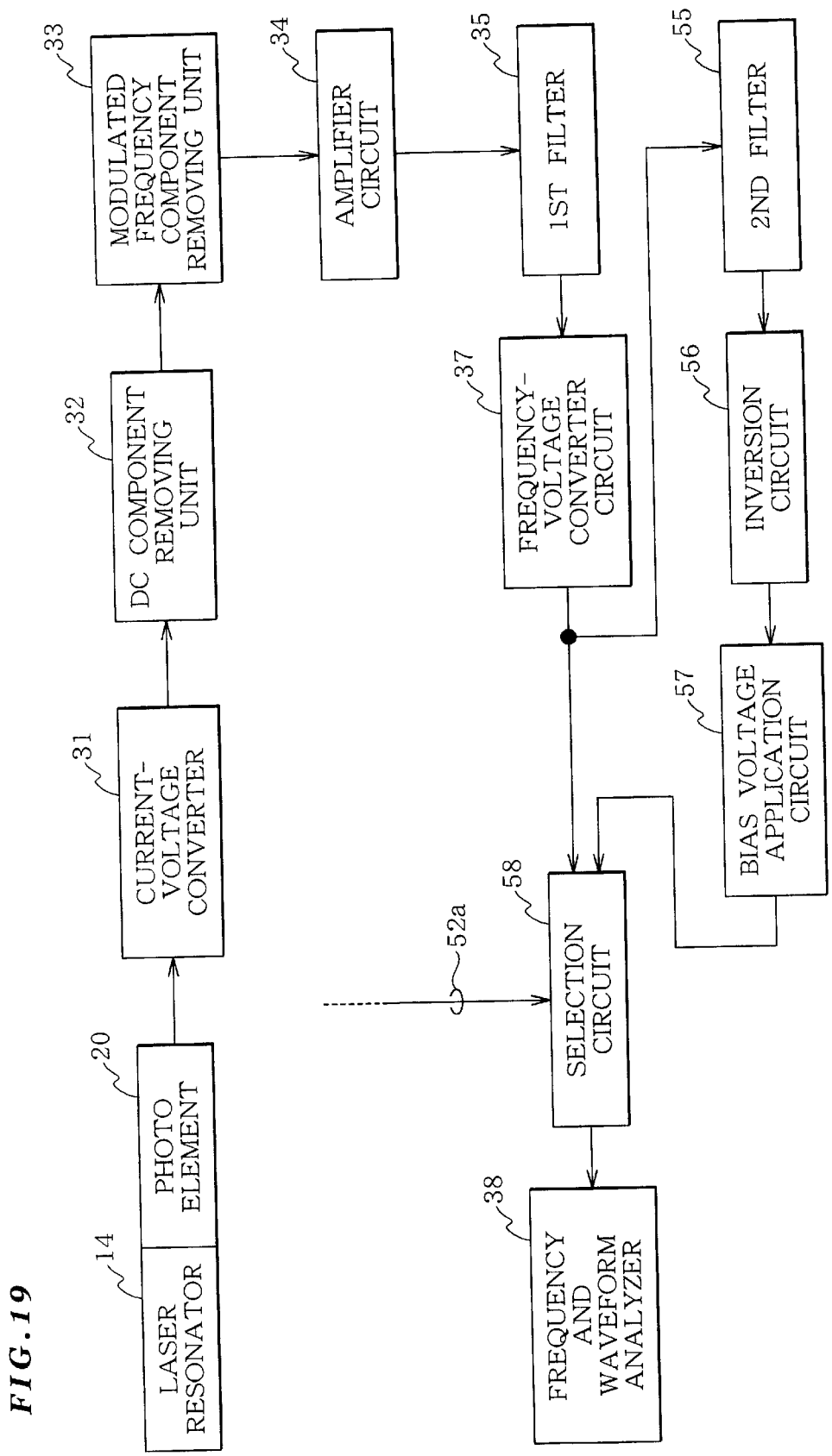
FIG. 19 is a block diagram showing a first configuration of the vibration measurement apparatus of the configuration shown 11 added by a circuit for processing at laser drive current decrease.

FIG. 18 shows a circuit corresponding to the time chart of FIG. 17. In the example of FIG. 18, the maximum value and the minimum value are stored, and the drive current amount or the drive current amount converted into a voltage is compared in comparators 50 and 51, so as to detect the moment when the drive current is switched from increase to decrease or vice versa. The signals output from the comparators 50 and 51 may be subjected rectification and voltage level adjustment before they are supplied to a latch circuit 52 such as a flip-flop and a mono-stable vibrator, where a period identification signal can be generated. Moreover, in addition to the maximum value and the minimum value, a center voltage can also be used for identification.

The switching moment between the increase and decrease of the drive current can also be identified as follows. The drive current amount is converted into voltage and its increase and decrease can be monitored to identify the period. Moreover, the drive current amount may be converted into voltage and a difference is obtained by using a differential circuit or the like and the sign of the difference is used to identify an increase or decrease period. Moreover, when the difference is zero, it is the moment to switch from increase to decrease or vice versa. Accordingly, the signal detected at this moment can be used for switching the period identification signal. Moreover, the drive current amount can be monitored by a circuit without being converted into voltage.

Furthermore, it is also possible to compare the beat frequency with an arbitrary (predetermined) frequency so as to identify the period. The beat frequency increases and decreases by the Doppler frequency Fb by modulated drive current around the frequency Fa as a center which is generated by the wavelength difference. At the moment when the drive current is shifted from increase to decrease (or vice versa), the wavelength difference between the oscillated beam and the return beam is based on the Doppler effect without any drive current change and accordingly, the beat frequency is lowered. Consequently, when the Doppler frequency is lowered than an arbitrary (predetermined) frequency, it is considered that the drive current has shifted from the increase to decrease (or vice versa), and the signal detected at this moment can be used for switching the period identification signal.

Moreover, in a vibration accelerated waveform in which the beat frequency is converted into voltage, the Doppler effect decrease corresponds to the voltage decrease of the vibration accelerated waveform. Accordingly, a signal detected when the voltage is lowered below an arbitrary (predetermined) voltage can be used for switching the period identification signal.

The aforementioned methods can also be used by digitizing the beat frequency waveform, vibration accelerated waveform, waveform of drive current converted into voltage, together with a digital circuit and a program.

<Continuous Measurement of a Beat Wave>

Next, explanation will be given on a continuous measurement of a beat wave without isolating a part. In the method shown in FIG. 17, it is difficult to perform a continuous measurement. Accordingly, it is preferable to divide the drive current increase period and the drive current decrease period so as to isolate a signal processing range, and correction can be performed to each of them. If the period is the drive current increase period, the laser beam oscillated from the resonator has a wavelength $\lambda 1$ when applied to an object to be measured, and is scattered on the surface of the object. Only a part of the scattered beam returns to the resonator. The return beam has a wavelength shifted to $\lambda 2$ because the drive current amount is increased. Accordingly, the oscillated beam having a wavelength $\lambda 1$ is mixed with a return beam having a wavelength $\lambda 2$.

If it is assumed f1=C/λ1 and f2=C/λ2, it is possible to determine f1−f2=Fa as the laser beam intensity change. If the object to be measured is vibrating, the Doppler frequency Fb is added to Fa, and the sign of Fb is changed according to the vibrating plane displacement direction. Thus, the beat frequency changes from +Fb to −Fb around the center Fa for one vibration cycle (here, Fa>Fb). When the Fa is frequency of a positive sign, if the vibrating plane displaces in the direction for making Fb positive, it is possible to obtain a beat frequency of |Fa+Fb|, and if the vibrating plane displaces in the direction for making Fb negative, it is possible to obtain a beat frequency of |Fa−Fb|.

On the other hand, during a period of laser drive current decrease, the relationship between the oscillated laser wavelength λ1 and the return wave length λ2 is reversed and the sign of Fa is changed. If the vibrating plane displaces in the direction to make Fb positive, beat frequency |Fa+Fb | is obtained, and if the vibrating plane displaces in the direction to make Fb negative , beat frequency |−Fa−Fb| is obtained. Accordingly, even if the vibrating plane is displacing at the same speed, different beat frequencies are obtained during increase and decrease of the laser drive current. As a result, the vibration speed waveform obtained by converting the beat frequency into voltage is reversed around the center voltage (voltage converted when only Fa is present).

Consequently, in order to perform a continuous measurement regardless of the increase period and the decrease period, the signal obtained should be corrected. In this case, processing circuits are selected according to the cycle of the drive current. That is, the increase period or the decrease period of the drive current is identified, so as to switch the processing circuit of the laser stage. For example, in addition to an increase period signal processing circuit, there are arranged decrease period signal processing circuit consisting of 55, 56, 57, so that a route is selected by the signal (period identification signal) which has identified the increase period or the decrease period. In this case, the signal which has passed through the frequency-voltage conversion circuit is supplied to a voltage sign reversing circuit only if at the decrease period. Thus, the result can be obtained in the same condition as during the increase period. It is also possible to add a filter 55 and a bias voltage supply circuit 57.

Figure 20:
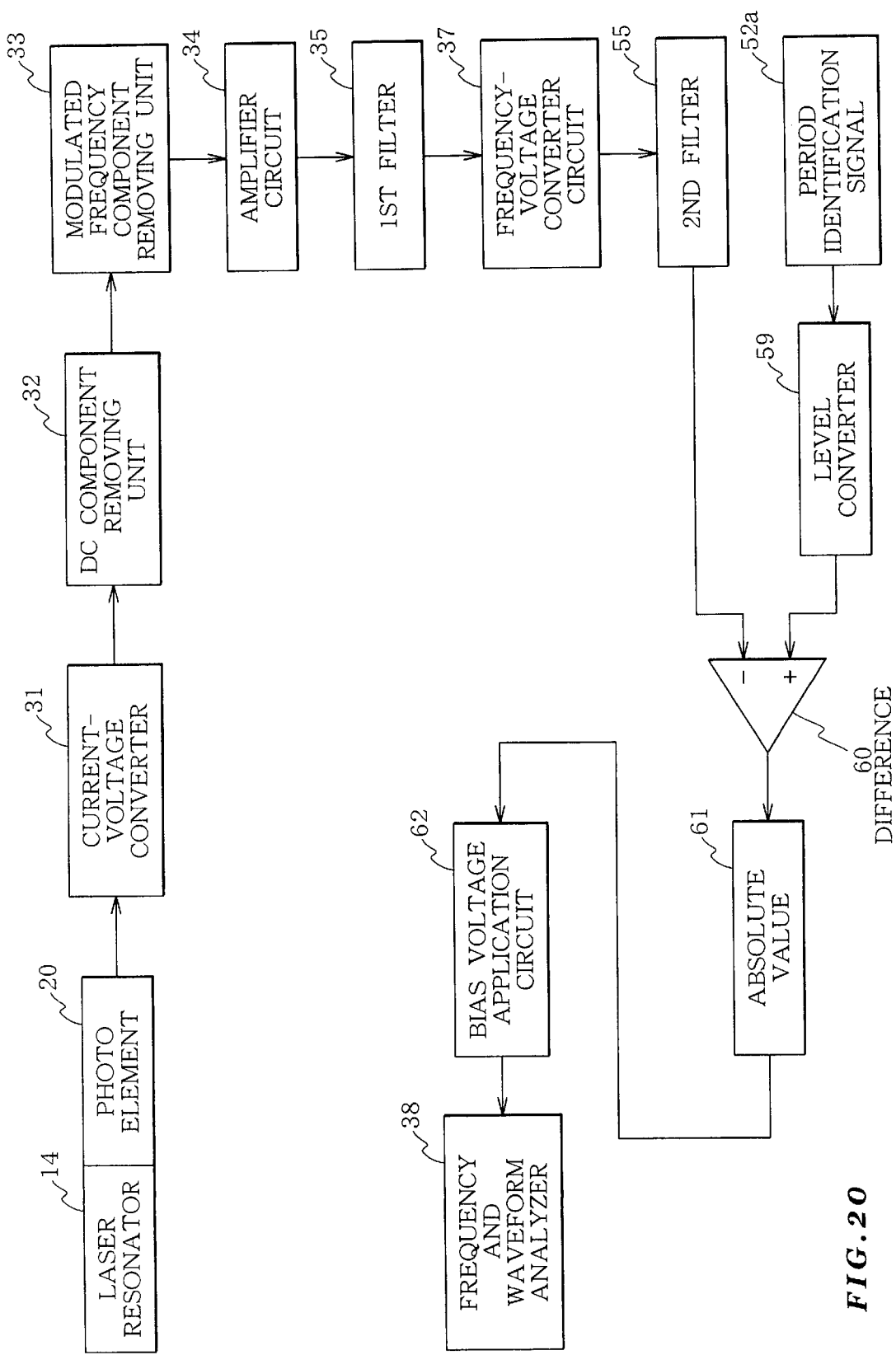
FIG. 20 is a block diagram showing a second configuration of the vibration measurement apparatus of the configuration shown 11 added by a circuit for processing at laser drive current decrease.
Figure 21:
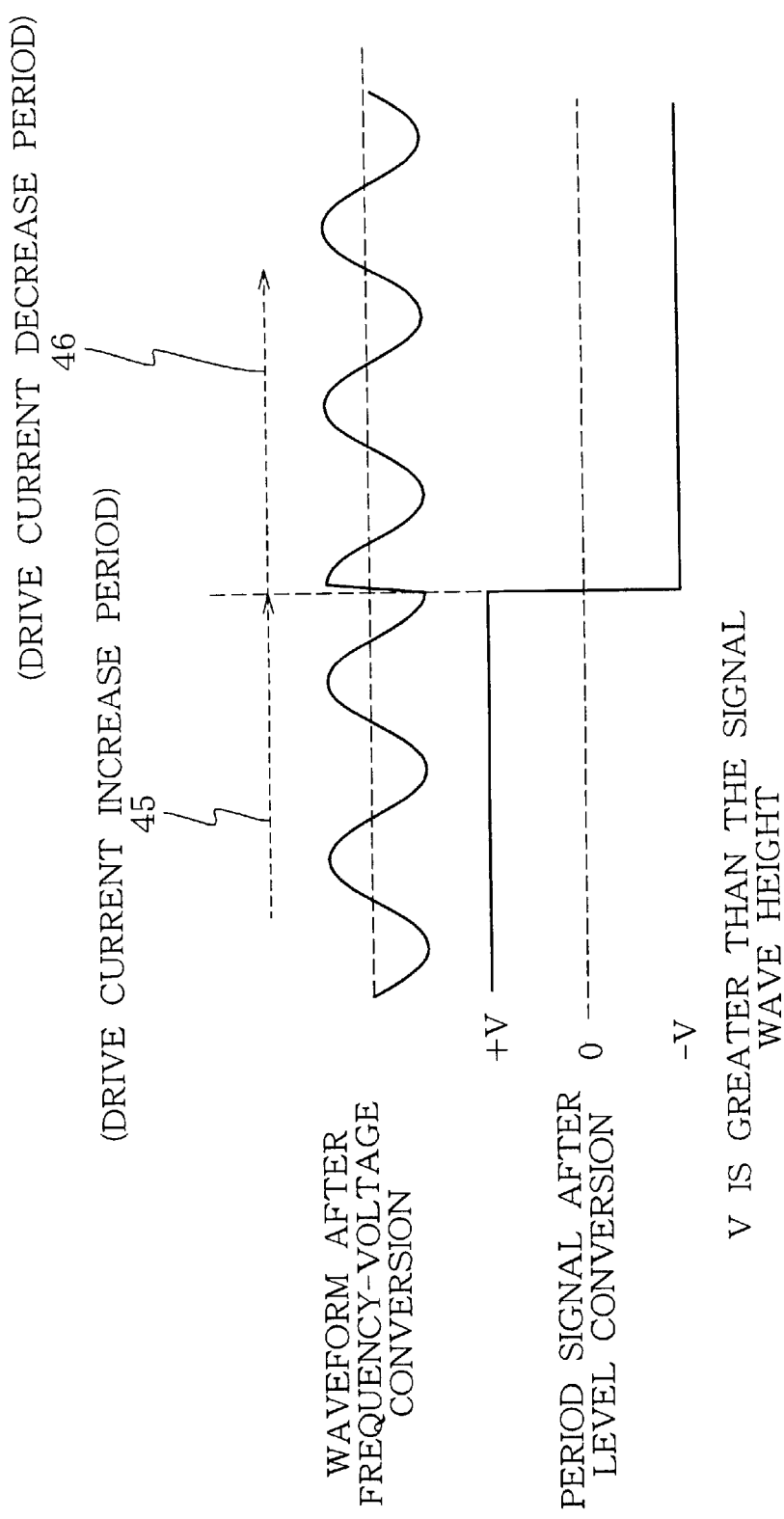
FIG. 21 is a time chart showing a configuration example of period identification signal generated by the configuration of FIG. 20 after level conversion.
Figure 22:
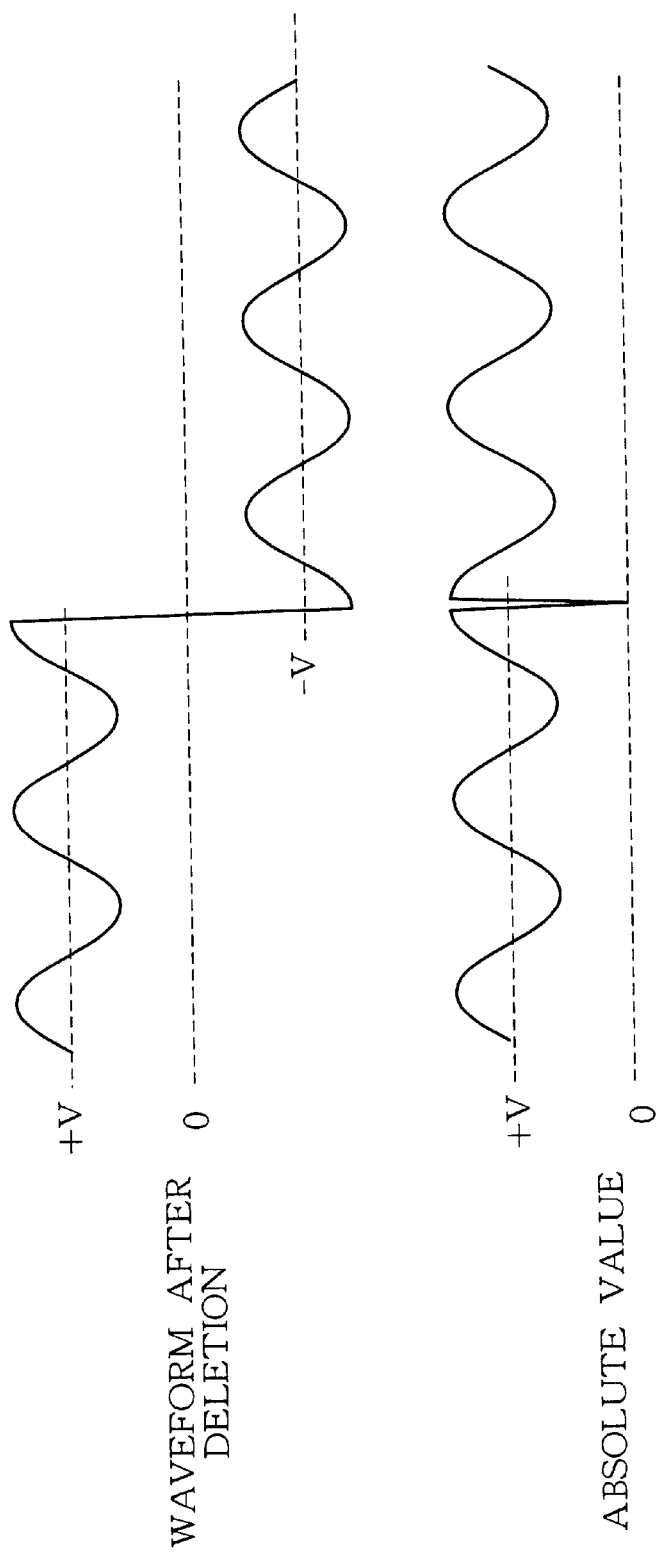
FIG. 22 is a time chart showing an example of speed change waveform as an absolute value generated by the configuration of FIG. 20.

FIG. 20 shows a technique in which for a vibration speed waveform of a beat frequency converted into voltage, by using the same circuit, the calculation value is changed according to the period identification signal. In the example of FIG. 20, a speed change waveform output from the frequency-voltage converter circuit 37 is supplied to a second filter 55 so as to be smoothed, for example. After this, the period identification signal 52a of the drive current is converted by a level converter 59 so as to be reference signal. FIG. 21 shows an example of the reference signal and the speed change waveform output from the frequency-voltage converter circuit 37. In FIG. 21, the voltage value V after the level conversion is greater than the wave height of the speed change waveform after filtering. Furthermore, in a difference circuit 60, a difference between the speed change waveform and the reference signal is obtained and made an absolute value in the absolute value unit 61. Then, the speed change waveform will be as shown in FIG. 22.

Figure 23:
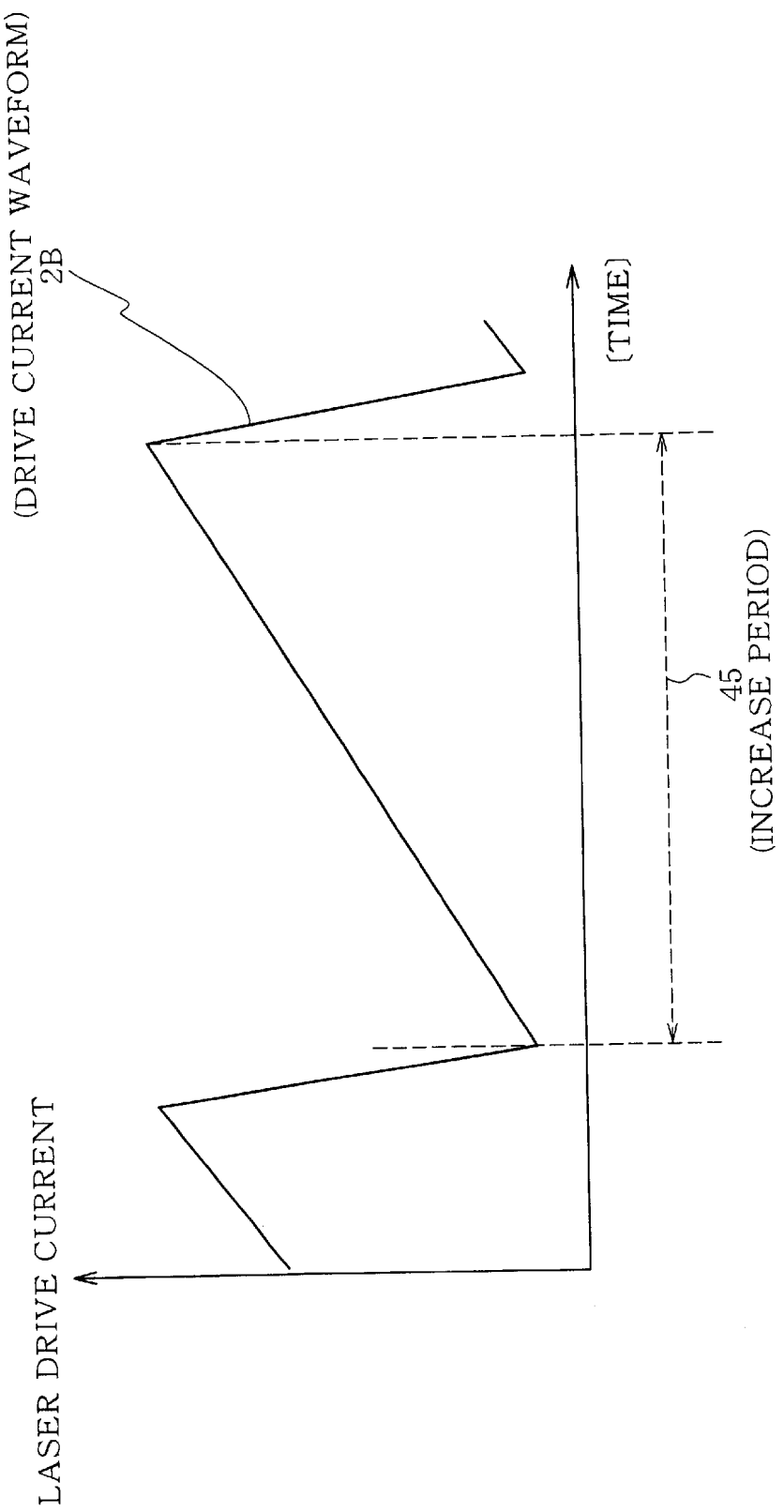
FIG. 23 is a waveform showing a laser drive current as a chopping wave.

As shown in FIG. 23, the laser drive current may be made chopping so as to eliminate affects by the change from the increase to decrease period and vice versa. In this case, the beam application step includes a chopping modulation step for modulating the drive current into a chopping wave. Then, it becomes possible to increase the drive current at the same increase speed using almost all of the one cycle of the drive current. This avoids need of switching of the processing circuit and enables to easily perform vibration measurement under a constant condition.

Figure 24:
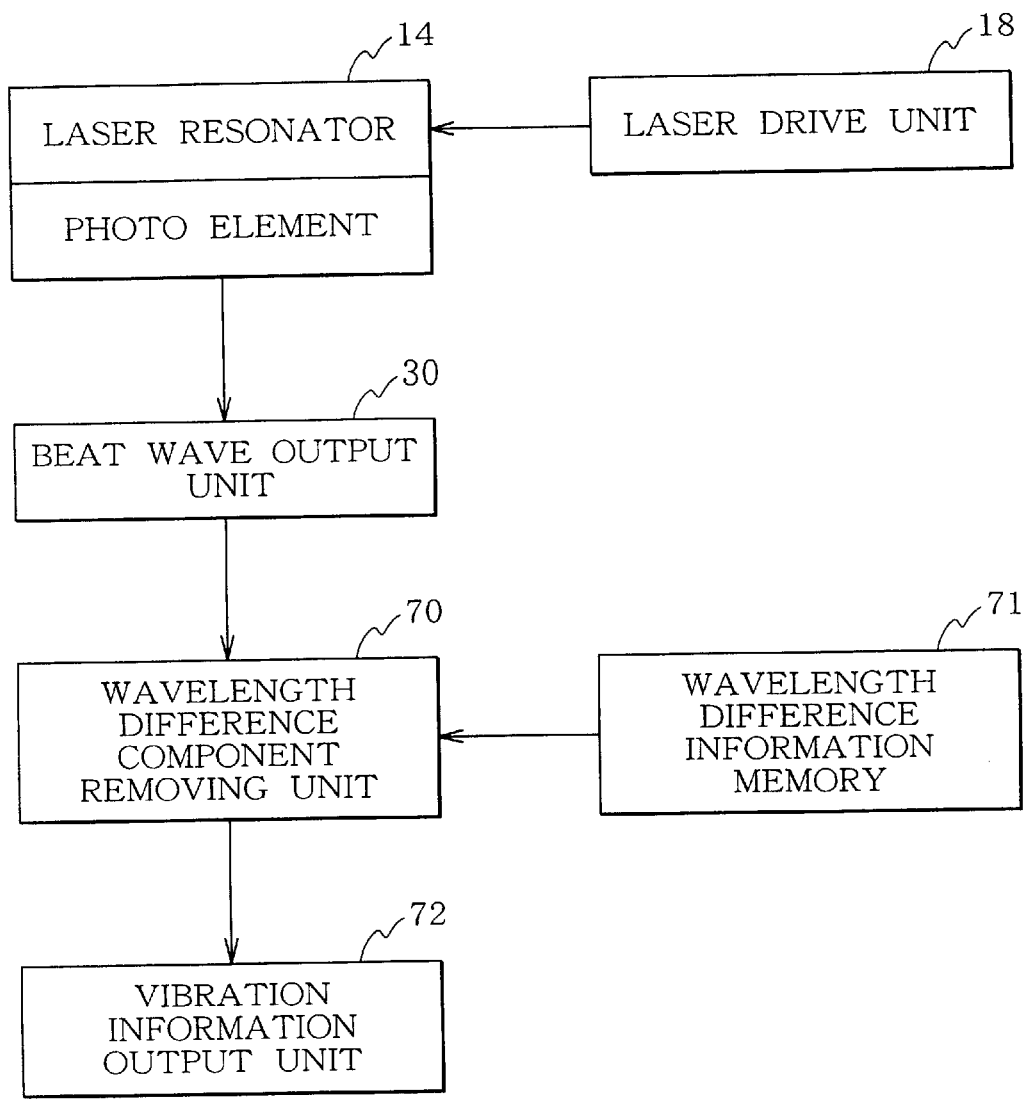
FIG. 24 is a block diagram showing a configuration example of the vibration measurement apparatus in which a beat wave is corrected by utilizing the wavelength difference along the time axis.

Next, explanation will be given on a case when a difference between a first wavelength and a second wavelength is changed. FIG. 24 is a block diagram showing a configuration example for eliminating a frequency component generated by a wavelength difference in a beat wave. As shown in FIG. 24, a beat wave output unit 30 is followed by: a wavelength difference information storage unit 71 containing a change information on the time axis which defines the wavelength difference change between the first and the second wave length; and a wavelength difference removing unit 70 for removing a component generated by a wavelength difference stored in the wavelength difference information storage unit 71. The wavelength difference removing unit 70 outputs a beat wave of a waveform generated by the Doppler effect alone. The time dependent change information stored in the wavelength difference information storage unit 71 is a wavelength difference caused by the change of the laser drive current, which has been measured or calculated beforehand. The time dependent change information to be stored may be a wavelength difference changing along the time axis or a beat frequency change caused by the wavelength difference.

Figure 25:
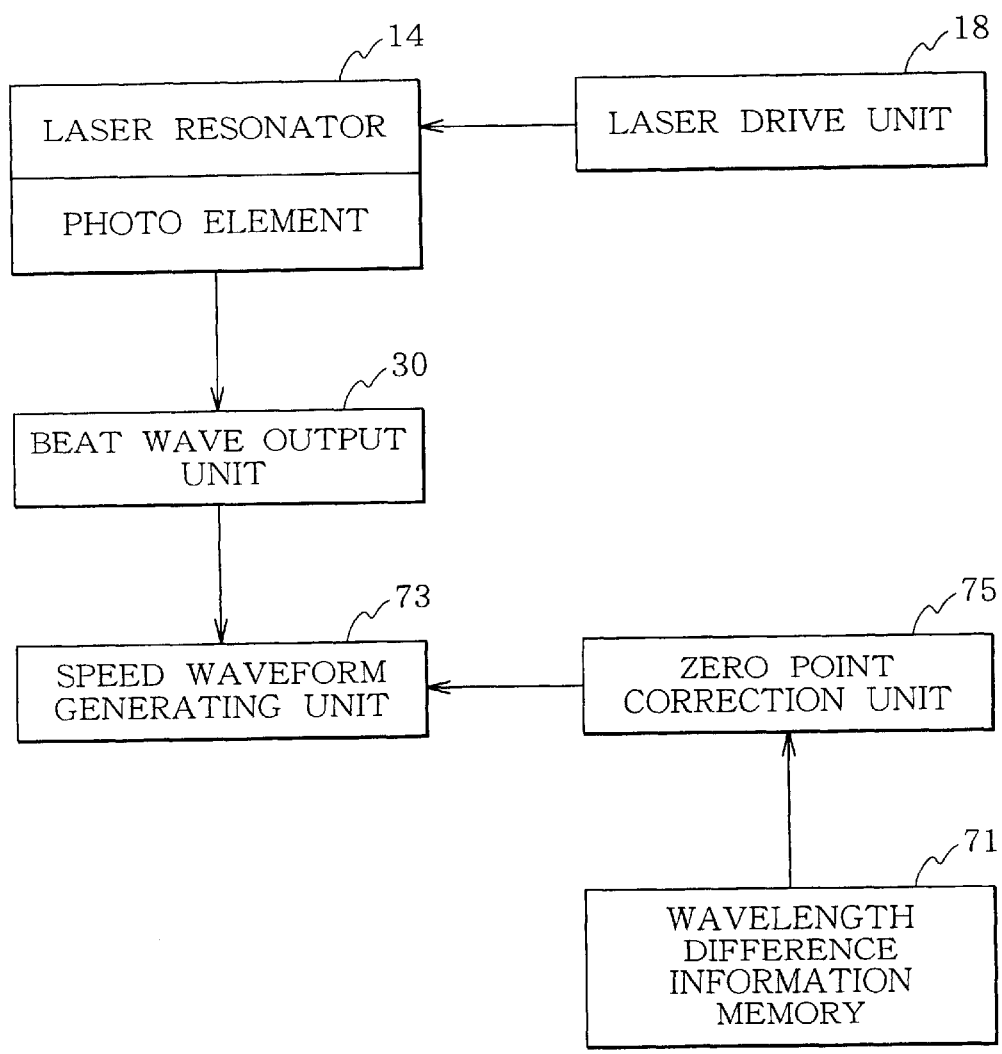
FIG. 25 is a block diagram showing a configuration example of the vibration measurement apparatus in which the zero reference of the speed change waveform is corrected by utilizing the wavelength difference along the time axis.

In the example of FIG. 25, the time dependent wavelength difference is used to correct the zero point of the speed change waveform 4 in FIG. 2. That is, in the example of FIG. 25, the beat wave output unit is followed by: a wavelength difference information storage unit 71 containing a change information on the time axis which defines the wavelength difference change between the first and the second wave length; and a zero point correction unit for correcting the zero point of the speed change waveform according to the time dependent change information of the wavelength difference stored in the wavelength difference information storage unit 71.

Moreover, when analyzing the vibration change of the object to be measured, the amplified beat frequency is converted into a digital data and stored in memory, after which the Fourier processing and other calculation can be performed by a program so as to obtain a waveform representing a vibration acceleration, speed, and displacement. The signal to be converted into a digital data may be a beat frequency converted into voltage.

As has been described above, unlike an ordinary vibration measurement method, the present example of self-mixing type using a semiconductor laser constitutes an external resonator between the laser resonator and the surface of the object to be measured. Accordingly, the number of necessary elements can be minimized, enabling to use a compact sensor head at a reasonable production cost.

According to the present invention, a beat wave is generated by a first wavelength beam applied to and reflected by an object to be measured, and changed by the Doppler effect according to the speed of the object displacement, and a second wavelength beam. Accordingly, it is possible to obtain a waveform of the Doppler frequency caused by the object displacement which is overlapped by a beat frequency caused by a wavelength difference. Consequently, even if the displacement of the object to be measured is less than half of the laser oscillation wavelength, it is possible to obtain a beat wave changing according to the Doppler frequency of the object to be measured. Moreover, if the beat frequency component due to a wavelength difference is removed from the beat wave generated in the beat wave generation step, it is possible to obtain the Doppler frequency caused by the displacement speed of the object to be measured. Furthermore, the vibration information output step outputs the beat wave generated by the beat wave generation step as a vibration information of the object to be measured and accordingly, it is possible to output the beat wave itself or the beat wave which has been frequency-voltage converted into a speed change waveform as well as the speed change waveform integrated into a displacement data. It is also possible to perform frequency analysis of the speed change waveform so as to generate a frequency spectrum of the object to be measured and output the frequency spectrum. Furthermore, it is possible to increase the measurement accuracy in comparison to the conventional measurement based on a half of the wavelength of the laser beam.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-311133 (Filed on Oct. 30, 1998) including specification, claims, drawings and summary are incorporated herein by reference in its entirety.

What is claimed is:

1. A vibration measurement method comprising:
   applying a laser beam of a first wavelength to a vibrating object;
   generating a beat wave by mixing a laser beam of a second wavelength different from the first wavelength and a return beam reflected by the object; and
   measuring a change in beat wave frequency to measure a vibration of the object.

2. The vibration measurement method as claimed in claim 1, wherein a change in beat wave frequency is used to measure a Doppler frequency caused by displacement speed of the object.

3. The vibration measurement method as claimed in claim 1, wherein a displacement of said object is smaller than $\lambda/2$, where $\lambda$ is an oscillation wavelength.

4. The vibration measurement method as claimed in claim 1, wherein said beat wave is frequency-voltage converted into a speed change waveform and said speed change waveform is integrated into a displacement data.

5. A vibration measurement method comprising:
   applying a laser beam of a first wavelength to a vibrating object;
   generating a beat wave from a laser beam of a second wavelength different from the first wavelength and a return beam reflected by the object;
   outputting the generated beat wave as a vibration information of the object; and
   generating a speed change waveform from the beat wave according to a difference between the first wavelength and the second wavelength.

6. The vibration measurement method as claimed in claim 5, wherein the difference between the first wavelength and the second wavelength is set to be equal to or above an inverse (2/Ta) of half (Ta/2) of the vibration cycle (Ta) of the object.

7. A vibration measurement method comprising:
   applying a modulated drive current to a laser resonator to successively change a wavelength of a laser beam and applying the laser beam whose wavelength is successively changed, to a vibrating object;
   receiving a return beam reflected by the object, and generating a beat wave by mixing the return beam and the laser beam whose wavelength has been changed; and
   measuring a change in beat wave frequency to measure a vibration of the object.

8. The vibration measurement method as claimed in claim 7, further comprising:
   modulating the drive current into a chopping wave.

9. A vibration measurement method comprising:
   applying a modulated drive current to a lager resonator and applying from the laser resonator a laser beam whose wavelength is successively changed, to a vibrating object;
   receiving a return beam reflected by the object, and generating a beat wave by mixing the return beam and the laser beam whose wavelength has been changed;
   outputting the generated beat wave as a vibration information of the object;
   detecting a switching moment from an ascending period to a descending period or vice versa of the drive current;
   dividing the beat wave into a portion corresponding to the drive current ascending period and a portion corresponding to the drive current descending period according to the detected switching moment; and
   converting the beat wave into a speed change waveform according to the divided beat wave and a difference in wavelength of beams oscillated at different moments of time, during the ascending period and the descending period of the drive current.

10. A vibration measurement method comprising:
    applying a modulated drive current to a laser resonator and applying from the laser resonator a laser beam whose wavelength is successively changed, to a vibrating object;
    receiving a return beam reflected by the object, and generating a beat wave by mixing the return beam and the laser beam whose wavelength has been changed;
    outputting the generated beat wave as a vibration information of the object;
    removing from the beat wave frequency a component caused by a difference in the wavelength successively changing, according to a time dependent change information defined beforehand; and
    converting the resultant beat wave frequency into voltage.

11. A vibration measurement method comprising:
    applying a modulated drive current to a laser resonator and applying from the laser resonator a laser beam whose wavelength is successively changed, to a vibrating object;
    receiving a return beam reflected by the object, and generating a beat wave by mixing the return beam and the laser beam whose wavelength has been changed;
    outputting the generated beat wave as a vibration information of the object;
    converting the beat wave frequency into voltage so as to output a speed change waveform; and
    correcting the zero point of the speed change waveform according to the time dependent change information defined beforehand for the wavelength difference.

12. A vibration measurement apparatus comprising:
    a laser resonator for oscillating a laser beam to be applied to an object to be measured and receiving a return beam reflected by the object to be measured;

a laser drive unit for driving the laser resonator with a modulated drive current; and a beat wave output unit for outputting a beat wave generated by self mixing in the laser resonator;

wherein a difference between a first wavelength of the beam applied and a second wavelength oscillated when the return beam is received is set in such a manner that a frequency (Fa) caused by the wavelength difference is equal to or above an inverse (2/Ta) of half (Ta/2) of the vibration cycle (Ta) of the object to be measured.

13. The vibration measurement apparatus as claimed in claim 12, the apparatus further comprising a speed change waveform generation unit for converting into voltage the beat wave frequency output from the beat wave output unit, so as to generate a speed change waveform of the object to be measured.

14. The vibration measurement apparatus as claimed in claim 13, the apparatus further comprising:

a wavelength difference memory containing the time dependent change of the difference between the first and the second wavelength as a predefined time dependent change information; and a wavelength difference component removing unit for removing from the beat wave frequency the component caused by the wavelength difference.

15. The vibration measurement apparatus as claimed in claim 13, the apparatus further comprising:

a wavelength difference memory containing the time dependent change of the difference between the first and the second wavelength as a predefined time dependent change information; and a zero point correction unit for correcting the zero point of the speed change waveform according to the time dependent change information stored in the wavelength difference information memory.

16. A vibration measurement apparatus comprising:

a beam resonator for oscillating a beam of a first wavelength and a beam of a second wavelength different from the first wavelength, wherein the beam of the first wavelength is reflected from a vibrating object, and returned to the beam resonator as a return beam;

beat wave output unit for outputting a beat wave obtained by self-mixing of the oscillated beam of a second wavelength with the return beam; and beat wave analyzer for measuring a change in beat wave frequency to measure a vibration state of the object.

17. The vibration measurement apparatus as claimed in claim 16, wherein said apparatus measures a vibration of said object independently of a displacement amount of said object.

18. The vibration measurement apparatus as claimed in claim 16, wherein a displacement of said object is smaller than $\lambda/2$, where $\lambda$ is an oscillation wavelength.

19. The vibration measurement apparatus as claimed in claim 16, wherein said beat waver is frequency-voltage converted into a speed change waveform and said speed change waveform is integrated into a displacement data.

20. A vibration measurement apparatus comprising:

oscillating means for oscillating a beam of a first wavelength and a beam of a second wavelength different from the first wavelength, wherein the beam of the first wavelength is reflected from a vibrating object, and returned to the oscillating means as a return beam;

means for outputting a beat wave obtained by self-mixing of the oscillated beam of a second wavelength with the return beam; and means for identifying a vibration state of the object, according to the beat wave;

wherein the means for identifying a vibration state of the object to be measured comprises:

means for removing from the beat wave frequency a component caused by the wavelength difference, so as to extract the Doppler frequency component of the object; and means for generating a speed change waveform of the object, using the Doppler frequency of the object.

* * * * *